United States Patent
Hunzinger et al.

(10) Patent No.: US 7,164,654 B2
(45) Date of Patent: Jan. 16, 2007

(54) ARQ PARAMETER RETRANSMISSION CONTROL FOR VARIABLE DATA RATE CHANNELS

(75) Inventors: Jason F. Hunzinger, Carlsbad, CA (US); Ramon A. Khalona, Carlsbad, CA (US)

(73) Assignee: Denso Corporation, Kariya (JP)

( * ) Notice: Subject to any disclaimer, the term of this patent is extended or adjusted under 35 U.S.C. 154(b) by 982 days.

(21) Appl. No.: 10/093,925

(22) Filed: Mar. 8, 2002

(65) Prior Publication Data
US 2002/0172192 A1 Nov. 21, 2002

Related U.S. Application Data

(60) Provisional application No. 60/274,403, filed on Mar. 9, 2001.

(51) Int. Cl.
*H04L 1/00* (2006.01)

(52) U.S. Cl. ................................ 370/230; 370/252

(58) Field of Classification Search ............ 370/216, 370/229, 232, 252, 253, 230, 235
See application file for complete search history.

(56) References Cited

U.S. PATENT DOCUMENTS

| | | | |
|---|---|---|---|
| 5,027,356 A | 6/1991 | Nakamura et al. | |
| 5,586,118 A | 12/1996 | Hashimoto et al. | |
| 5,896,402 A | 4/1999 | Kurobe et al. | |
| 5,940,769 A * | 8/1999 | Nakajima et al. | 455/509 |
| 6,057,534 A | 5/2000 | Terho et al. | |
| 6,088,342 A | 7/2000 | Cheng et al. | |
| 6,272,332 B1 | 8/2001 | Matsumoto et al. | |
| 6,907,005 B1 * | 6/2005 | Dahlman et al. | 370/236 |

OTHER PUBLICATIONS

U.S. Appl. No. 09/469,424, filed Dec. 23, 1999, Hunzinger et al.

* cited by examiner

*Primary Examiner*—Chau Nguyen
*Assistant Examiner*—Kerri M. Rose
(74) *Attorney, Agent, or Firm*—Morrison & Foerster LLP

(57) ABSTRACT

A method and apparatus for controlling the maximum number of retransmissions of an information packet that may be attempted if the information packet was not properly received is disclosed. The number of re-transmissions of messages is limited using maximum allowable retransmission (MAR) values. By assigning multiple MAR values over a range of possible data rates, an efficient distribution of MAR values can be assigned to the range of possible data rates to minimize the overall latency of the communication link. MAR messages are utilized to efficiently create a preferred assignment of MAR values over the range of possible data rates.

70 Claims, 6 Drawing Sheets

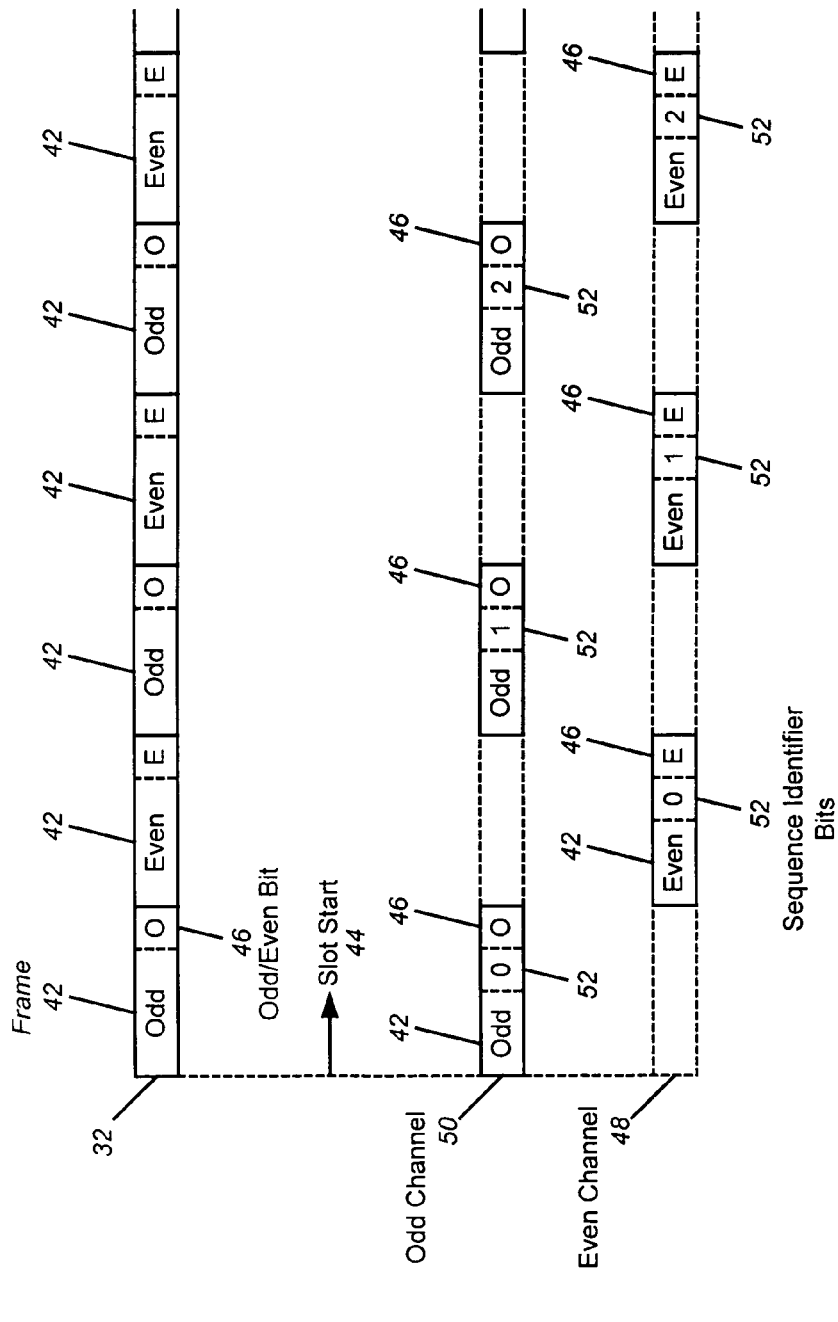
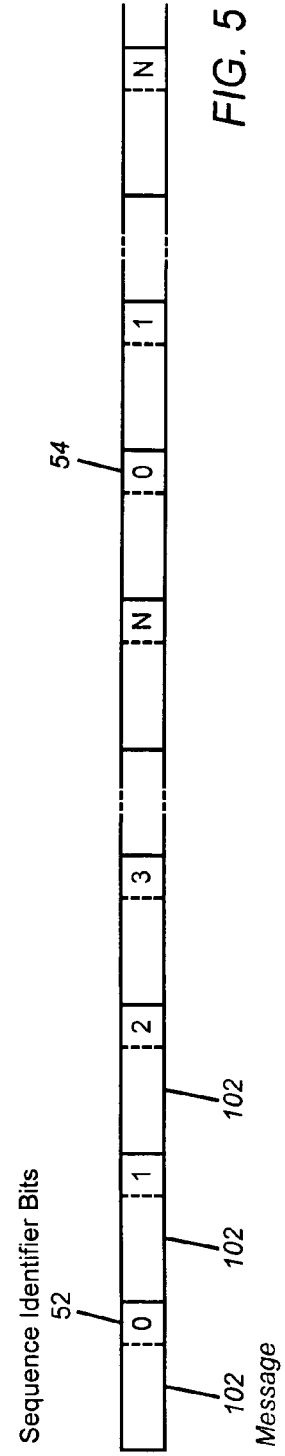

ARQ PARAMETER RETRANSMISSION CONTROL FOR VARIABLE DATA RATE CHANNELS

CROSS-REFERENCE TO RELATED APPLICATIONS

Embodiments of the present invention claim priority from U.S. provisional patent application Ser. No. 60/274,403 entitled "Adjustable Level of Override on Number of ARQ Retransmissions for Variable Data Rates," filed Mar. 9, 2001, and are related to U.S. patent application Ser. No. 09/469,424 entitled "Improvements in Mobile Station to Base Station Communication and Signal Acknowledgement," filed Dec. 23, 1999, the contents of which are incorporated herein by reference for all purposes.

BACKGROUND OF THE INVENTION

1. Field of the Invention

The present invention relates, generally, to communication network management and, in one embodiment, to a method and apparatus for controlling the maximum number of retransmissions of an information packet that may be attempted if the information packet was not properly received.

2. Description of Related Art

Introduction

Rather than just providing a means for emergency communications, cellular telephones are rapidly becoming a primary form of communication in today's society. As cellular telephone usage becomes widespread, cellular communication networks are becoming increasingly prevalent and are providing coverage over larger areas to meet consumer demand.

FIG. 1 illustrates an example system environment including a mobile station (MS) capable of maintaining a connection 30 with a cellular communication network 22 as the MS 10 roves through a geographic area served by the cellular communication network 22. It should be understood that a connection, as referred to herein, includes, but is not limited to, voice, multimedia video or audio streaming, packet switched data and circuit switched data connections, short message sequences or data bursts, and paging. The cellular communication network 22 includes a first base station (BS) 12 communicating over sectors 14 and 16, and a second BS 18 communicating over sector 20. A BS is typically comprised of multiple sectors, usually three. Each BS includes a separate transmitter and antenna (transceiver) for each sector, pointed in the direction of the sector. Because a BS can be omni or sectorized, it should be understood that the terms BS and sector may be used interchangeably herein. Furthermore, when referring to access to a network via a network access point, the terms BS, sector, and network may be used interchangeably herein. The BSs are connected to network infrastructure entities including BS controllers (BSC) 24 that may control a cell cluster 26, and communicate with a mobile switching center (MSC) 28. It should be understood that the MS 10 and one or more of these network infrastructure entities contain one or more processors for controlling communications between the MS 10 and the network 22. The processors include memory and other peripheral devices well understood by those skilled in the art.

In the course of such roving, MS 10 travels from position A to position B to position C and will, as a matter of course, experience variations in signal strength and signal quality of the communication link associated with the BS(s) that it is in contact with. Signal strength and quality can be especially undependable near the edges of the sectors, such as when the MS 10 transitions from the area defined by the dotted line of sector 14 to the area defined by the dotted line of sector 16, or from sector 16 to sector 20. It is in these transition areas, as well as other areas of weak signal strength or quality, where poor connections are likely to occur.

Poor connections between the MS 10 and the network 22 result in the improper transmission of information. For example, if information is communicated in discrete packets such as messages or frames, a poor connection can lead to message or frame errors and the receipt of bad messages or frames. If the receiving entity is able to notify the transmitting entity of the bad messages or frames, the transmitting entity may be able to re-transmit the messages or frames. However, if the conditions that created the poor connection are persistent, the retransmitted messages or frames still may not be properly received. The transmitting entity may continue to re-transmit the messages or frames, but if they are not properly received, the continued re-transmission of messages or frames can lead to latency problems in the connection. Thus, limiting the number of re-transmissions of messages or frames is important to cellular network providers.

Cellular Communication Links

FIG. 2 illustrates an exemplary communication link 30 between a MS 10 and a BS 12. Communications from the BS 12 to the MS 10 are called the forward link, and communications from the MS 10 to the BS 12 are called the reverse link. The forward and reverse links utilize a number of forward and reverse channels. For example, the BS 12 communicates with the MSs using a plurality of forward common channels or links which may include, but are not limited to, one or more pilot channels, a sync channel, and one or more paging channels, discussed in greater detail below. These channels are referred to as common channels because the BS 12 may communicate those channels to all MSs in the network. Generally, these common channels are not used to carry data, but are used to broadcast and deliver common information.

Each sector within BS 12 broadcasts a pilot channel that identifies that sector and is simple for a MS 10 to decode. Both sectors and pilot channels are distinguished by pseudo-noise (PN) offsets. The word "pilot" can be used almost interchangeably with the term sector, because a pilot channel identifies a sector. The pilot channel implicitly provides timing information to the MS, and is also used for coherent demodulation, but it otherwise typically does not contain any data. When a MS is first powered up, it begins searching for a pilot channel. When a MS acquires (is able to demodulate) a pilot channel, the timing information implicit in the pilot channel allows the MS to quickly and easily demodulate a sync channel being transmitted by the network.

Because the sync channel contains more detailed timing information, once the MS acquires the sync channel, the MS is then able to acquire a paging channel being transmitted by the same BS that is transmitting the pilot channel. That BS is known as the active BS. When a cellular network is attempting to initiate communications with a MS through a particular BS, a "page" is transmitted to that MS on the paging channel of that BS. Thus, once the MS is able to demodulate the paging channel of a particular BS, the MS may then monitor that paging channel while the MS is idle and waiting for incoming connections or an incoming message. In general, each BS may utilize one pilot channel, one sync channel and one paging channel that are common for all MSs to receive. However, because there are practical limitations on the number of MSs that can be simultaneously paged using one paging channel, some BSs may employ multiple paging channels.

In addition to the forward common channels described above, the BS 12 communicates with individual MSs using a plurality of forward dedicated channels or links which may include, but are not limited to, multiple traffic channels, multiple supplemental channels, and multiple access channels and control channels. These channels are referred to as dedicated channels because the BS communicates the channels to a specific MS 10, and the channels may carry data.

The reverse channels or links may include an access channel and one or more reverse traffic channels and control channels. After a MS receives an incoming page from a BS, the MS will initiate a connection setup using, in part, an access channel.

Cellular Network Communication Schemes

The previously described channels may employ different coding schemes. In time division multiple access (TDMA), multiple channels may be communicated at a particular frequency within a certain time window by sending them at different times within that window. Thus, for example, channel X may use one set of time slots while channel Y may use a different set of time slots. In frequency division multiple access (FDMA), multiple channels may be communicated at a particular time within a certain frequency window by sending them at different frequencies within that window.

Code division multiple access (CDMA) is a technique for spread-spectrum multiple-access digital communications that creates channels through the use of unique code sequences. It allows a number of MSs to communicate with one or more BSs in neighboring cell sites, simultaneously using the same frequency. In CDMA, given a space of frequency and time, each channel is assigned a particular orthogonal code such as a Walsh code or a quasi-orthogonal function (QOF). In direct sequence CDMA, the data from each channel is coded using Walsh codes or QOFs and then combined into a composite signal. This composite signal is spread over a wide frequency range at a particular time.

When this composite signal is de-spread using the same code used to spread the original data, the original data may be extracted. This recovery of the original data is possible because Walsh codes and QOFs create coded data that, when combined, don't interfere with each other, so that the data can be separated out at a later point in time to recover the information on the various channels. In other words, when two coded sequences of data are added together to produce a third sequence, by correlating that third sequence with the original codes, the original sequences can be recovered. When demodulating with a particular code, knowledge of the other codes is not necessary.

The CDMA wireless communication system is fully described by the following standards, all of which are published by the TELECOMMUNICATIONS INDUSTRY ASSOCIATION, Standards & Technology Department, 2500 Wilson Blvd., Arlington, Va. 22201, and all of which are herein incorporated by reference:

| CDMA/WCDMA Standard | Publication date |
|---|---|
| TIA/EIA-95A | 1993 |
| TIA/EIA-95B | Feb. 1, 1999 |
| TIA/EIA/IS-2000, Volumes 1–5, Release A | Mar. 1, 2000 |
| TIA/EIA-98D | June 1, 2001 |
| 3GPP TS 25.214 V4.2.0 | September 2001 |
| TS 25.401 V5.1.0 | September 2001 |
| TR 25.922 V4.1.0 | Oct. 2, 2001 |
| TS 25.331 V4.2.0 | Oct. 8, 2001 |

As illustrated in FIG. 3, a channel 96 may be broken up into superframes or slots 98, typically of 80 millisecond duration. Each slot may be divided into three phases 100. These phases are numbered 0, 1 and 2 in FIG. 3. Coincident with the timing of the phases are four frames 34. These four frames are aligned with the three phases at the superframe boundaries. Each frame 34 is therefore typically 20 milliseconds long. Other frame sizes such as 5 ms, 10 ms and multiples of 20 ms can also be used. A message is typically comprised of one or more frames.

Within a superframe, preambles of various lengths can be transmitted prior to transmission of the frames, for example, in the case of reverse access channels and reverse common control channels. It should be understood that the content of the frames 34 can differ. One frame may contain a header 36, signaling 38 and data 40 multiplexed on different code channels, another may contain only signaling, and yet another may contain only data. Each frame 34 may also have a different data rate, which can be changed on a frame-by-frame basis. In some example communication standards, there are four rates: full, one-half, one-fourth and one-eighth. Thus, for example, with no voice activity, information may be transmitted at a one-eighth frame rate, which would be beneficial because less power or bandwidth is required to communicate information at a slower rate. The network capacity can be increased as the interference is reduced.

Communications between a MS and the network may also employ dual channels. In the example of FIG. 4, frames 42 being communicated between a MS and a BS (see reference character 32) can be designated as even or odd based on when the frames are transmitted in relation to system time slots 44, or each frame 42 could contain a bit 46 indicating whether that frame is even or odd. In this manner, dual even and odd channels 48 and 50, respectively, can be created. Note that the dual channels do not contain the same information, but rather are independent channels carrying unique information.

Frame Errors

In CDMA systems, signals can be received in the presence of high levels of narrow-band or wide-band interference. The practical limit of signal reception depends on the channel conditions and interference level. Types of interference include those generated when the signal is propagated through a multi-path channel, signals transmitted to and from other users in the same or other cell sites, as well as self-interference or noise generated at the device or MS. However, noise and interference in the field may require error correction to determine what was actually transmitted.

In a practical communications network, it is neither realistic nor desirable to target an error rate of zero percent (i.e., all frames received properly). Rather, a frame error rate of one percent, for example, is targeted. Power control loops can be used to maintain a desirable frame error rate. In this example, if the frame error rate rises above one percent, then the power control loop might increase the power of signals transmitted by the MS so that the frame error rate decreases to approximately one percent. On the other hand, if the frame error rate is less than one percent, the power control loop may reduce transmitted power to save power, reduce interference, and allow the frame error rate to move up to one percent. The BS may therefore continuously instruct the MS, through power control bits in predetermined locations within a frame, to transmit at various power levels to maintain an error rate of approximately one percent as the MS moves around in a particular area, or other types of interferences begin or end. The MS typically abides by the power levels that are being recommended to it by the BS. In addition, the BS can also change its transmitter power for a particular channel, through similar power control loops. Thus, both the BS and the MS may continuously provide each other feedback in order to change the other's power levels. However, depending on its resource management such as channel power allocation limits, the BS may not necessarily change its transmitter power levels based on the feedback from the MS.

Automatic Repeat Request Parameters

When a transmitting entity sends a message to a receiving entity, the message may be identified by sequence numbers. Sequence numbers assist the receiving entity in detecting duplicate messages and provide a reference for acknowledgment procedures. Acknowledgment procedures are typically implemented as Layer 2 protocols. Typically, signaling messages such as handoff, overhead, and pilot signal strength messages (PSMMs) that require acknowledgement are assigned sequence numbers. FIG. 5 illustrates a series of signaling messages being transmitted over a channel in a single or multiple channel communication link. As illustrated in FIG. 5, the transmitting entity may number each unique message 102 from sequence number 0 to N using sequence identifier bits 52, where N is limited by the number of bits reserved for identifying the sequence number. Once sequence number N is reached, the sequence number will return to 0 (see reference character 54) and subsequent messages will be assigned sequence numbers starting from 0.

Note that the individual frames in a message transmitted over a channel in a single or multiple channel communication link may also be identified by sequence numbers. Referring again to FIG. 4, the frames in each channel (even and odd, for example) of a dual channel communication link could be governed by different sequence numbers. For example, the frames in the odd channel 50 may have sequence bits 52 containing sequence numbers 0, 1, 2, . . . N, while the frames in the even channel 48 may have sequence bits 52 also containing sequence numbers 1, 2, . . . N. Also, packets in a packet data connection could be identified by sequence numbers.

For purposes of simplifying the disclosure, reference will be made hereinafter primarily to messages as the type of information packet identified by sequence numbers. However, it should be understood that other information packets, including but not limited to frames, may also be identified by sequence numbers. Whether the sequence numbers identify messages, packets or frames, the sequence numbers are communicated from the transmitting entity to the receiving entity in a first Automatic Repeat Request (ARQ) parameter typically referred to as a message sequence number. This first ARQ parameter, which may take several different forms known to those skilled in the art, is part of an overall ARQ method and is typically embedded in the message, frame or packet. Background information on ARQ and data networks may be found in "Data Networks" by Dimitri Bertsekas and Robert Gallager, Prentice Hall, 2nd Edition 1992, the contents of which are incorporated herein by reference.

Referring again to FIG. 5, as the receiving entity receives messages from the transmitting entity, the receiving entity can use the sequence numbers, i.e. the first ARQ parameter type, to identify any missing messages that were not received properly. If the receiving entity detects that a message was not properly received, the receiving entity can send a second type of ARQ parameter back to the transmitting entity which identifies, either explicitly or implicitly, the missed sequence numbers. When this identification is explicit and positive, this second type of ARQ parameter is typically called an acknowledgment sequence number and specifically identifies a message that has not been received. This second type of ARQ parameter can also be considered an implicit request for the transmitting entity to retransmit the messages associated with the missed sequence numbers. In this case, the ARQ scheme is typically called a negative acknowledgement. This second type of ARQ parameter is also part of the overall ARQ method and is also typically embedded in a frame, message, or packet. As long as a message continues to be improperly received, the receiving entity may repeatedly send this second type of ARQ parameter to the transmitting entity in an attempt to receive a good frame. The second type of ARQ parameter may also be a bit embedded in every frame communicated by the receiving entity, indicating whether the previous message was properly received. For example, using the ARQ method, if the transmitting entity transmits messages identified by sequence numbers 0, 1, 2 and 3, and receives acknowledgement from the receiving entity that the messages identified by sequence numbers 0, 1 and 3 were received, then the transmitting entity implicitly knows that the message identified by sequence number 2 was not properly received, and should be retransmitted. In this case, the ARQ scheme is typically called a positive acknowledgement. The negative and positive acknowledgement schemes described above may be generally referred to herein as "acknowledgement procedures." When the transmitting entity has not received acknowledgment for a message associated with sequence number K, it will not transmit any new message using sequence number K until the current message associated with sequence number K is properly received and acknowledged. This eliminates the possibility that missing messages could not be uniquely identified (e.g., if the current message identified by sequence number 2 was not properly received and yet a new message was also identified by sequence number 2, the transmitting entity would not know which message to retransmit). However, this methodology also blocks the transmission of further messages until the retransmitted frame is properly received, creating latency in the communication link.

Dual or multiple channel communication links can reduce this latency problem, because the messages in each channel may be independently governed by different sequence numbers and ARQ parameters. Detection of improperly received messages, the communication of ARQ parameters, and retransmissions of messages can occur independently between the channels. For example, in a dual odd/even channel communication link, although the transmission of even channel messages may be delayed because one message was improperly received and is being repeatedly retransmitted, the transmission of odd channel messages may continue uninterrupted. Thus, the latency problem can be minimized in dual and multiple channel communication links. Note that because of message retransmissions, the sequence numbers between the odd and even channels may become skewed after some time has passed.

The latency described above occurs because as long as a message continues to be improperly received, the receiving entity may repeatedly send the second type of ARQ parameter to the transmitting entity, causing repeated retransmissions of the message. However, if retransmissions are continually unsuccessful, at some point in time it may be prudent for the receiving entity to skip the missing message and continue on by ceasing further transmissions of the second type of ARQ parameter. This may be accomplished by establishing an upper limit (hereinafter referred to as a maximum allowable retransmission (MAR) value) to the number of the second type of ARQ parameters (retransmission requests) that may be sent by the receiving entity, or to the number of retransmitted messages that may be sent by the transmitting entity.

To that end, proposals have been presented describing systems capable of communicating ARQ parameters at the start of a connection to assign a single MAR value for the highest three data rates that may be used by a channel. However, in higher data rate channels the signal-to-noise ratio is often higher, and therefore on average fewer retransmissions of frames will be needed. Thus, adjustment of the MAR value for the highest three data rates may not be particularly useful. In contrast, lower data rate channels often have a lower signal-to-noise ratio, requiring more retransmissions of frames, and therefore adjustment of MAR values for lower data rate channels may be more useful. The proposed systems do not allow multiple MAR values to be assigned across the entire range of possible data rates.

Therefore, a need exists for a method and apparatus that enables multiple MAR values to be assigned across a range of possible data rates, and enables updating of the MAR values during a connection.

SUMMARY OF THE INVENTION

Poor connections result in the improper transmission of information. For example, if information is communicated in discrete messages, a poor connection can lead to the improper receipt of messages. If the receiving entity is able to notify the transmitting entity of the improperly received messages and request retransmission of those messages, the transmitting entity may be able to re-transmit the messages. However, if the conditions that created the poor connection are persistent, the re-transmitted messages still may not be properly received. The transmitting entity may continue to re-transmit the messages, but if they are not properly received, the continued re-transmission of messages can lead to latency problems in the connection. To minimize the latency created by the continued re-transmission of messages, embodiments of the present invention limit the number of re-transmissions of messages using MAR values, which represent the maximum number of allowed retransmissions.

The present invention is based on the recognition that the selection of an appropriate MAR value may be dependent on the current data rate of the channel. Thus, embodiments of the present invention enable different MAR values to be assigned across a range of possible data rates. By assigning multiple MAR values over a range of possible data rates, an efficient distribution of MAR values can be assigned to the range of possible data rates to minimize the overall latency of the communication link.

Embodiments of the present invention utilize MAR messages to efficiently create an assignment of MAR values over the range of possible data rates. This assignment of MAR values may be stored in the receiving entity and used to limit the number of retransmission requests sent by the receiving entity, or may be stored in the transmitting entity and used to limit the number of retransmitted messages sent by the transmitting entity.

MAR messages may utilize a negotiation process, with either the transmitting entity or the receiving entity being the final arbiter of the assignment of MAR values. For example, in the case where the assignment of MAR values is stored in the receiving entity, and therefore limits the number of retransmission requests sent by the receiving entity, at the start of a connection the receiving entity may first send one or more initial MAR messages to the transmitting entity containing information related to the receiving entity's initial assignment of MAR values over the range of possible data rates for the communication link. This initial assignment of MAR values may be determined based on statistics, history of past experiences, or current conditions known by the receiving entity. The transmitting entity may also store its own assignment of MAR values over the range of possible data rates for the communication link, which may be based on statistics, history of past experiences, or current conditions known by the transmitting entity. The transmitting entity may "negotiate" the information in the initial MAR messages from the receiving entity with its own assignment of MAR values, resolve any conflicts, and transmit one or more MAR messages back to the receiving entity containing information related to the negotiated assignment of MAR values over the range of possible data rates for the communication link. If the transmitting entity is the final arbiter of the assignment of MAR values, these MAR messages will be accepted by the receiving entity as the assignment of MAR values. However, if the receiving entity is the final arbiter, these MAR messages may be further "negotiated" by the receiving entity before the assignment of MAR values is generated.

Once the assignment of MAR values has been received and stored by the receiving entity, the transmitting entity can commence transmitting messages over the communication link with sequence numbers assigned in accordance with embedded ARQ parameters of a first type. Thereafter, the receiving entity will use the received sequence numbers to detect improperly received messages and request retransmission of these messages using ARQ parameters of a second type. However, these retransmission requests will be limited in accordance with the current data rate of the communication link and the assignment of MAR values stored in the receiving entity.

In the case where the assignment of MAR values is stored in the transmitting entity, and therefore limits the number of retransmitted messages sent by the transmitting entity, a process similar to the one described above is employed to determine the assignment of MAR values. Once the assignment of MAR values has been received and stored by the transmitting entity, the transmitting entity can commence transmitting messages over the communication link with sequence numbers assigned in accordance with embedded ARQ parameters of the first type. Thereafter, the receiving entity will use the received sequence numbers to detect improperly received messages and request retransmission of these messages using ARQ parameters of the second type. However, message retransmissions by the transmitting entity will be limited in accordance with the current data rate of the communication link and the assignment of MAR values stored in the transmitting entity.

Each MAR message described above specifies a particular MAR value, and may include a data rate or a range of data rates. In one embodiment, a basic MAR message contains the following information fields:

[MAR value] [LLDR] [ULDR], where LLDR stands for lower limit data rate and ULDR stands for upper limit data rate. By sequencing the transmission of a set of MAR messages, an assignment of MAR values over the range of data rates can be generated. However, in other embodiments of the present invention, other MAR messages may be employed that contain one or more of the following fields:

[MAR value] [LLDR flag] [ULDR flag] [LLDR] [ULDR].

These fields may be utilized to assign a MAR value to an entire data rate range, provide a data rate range indicator for use with a lookup table to determine a data rate range, assign a MAR value to a data rate range having a specified upper limit, assign a MAR value to a data rate range having a specified lower limit, or assign a MAR value to a data rate range having a specified lower and upper limit. In other words, the flags identify whether or not the respective upper or lower limits are included or should be interpreted as being the default value for such.

Embodiments of the present invention also utilize methodologies capable of being implemented in software or hardware in either the receiving entity, the transmitting entity, or both, for creating the assignment of MAR values using an efficient sequence of MAR messages. "Enumeration," "MAR value coverage," and "MAR pattern recognition" methodologies may be employed alone, or combined in a sequence as portions of the assignment of MAR values are created.

These and other features and advantages of embodiments of the present invention will be apparent to those skilled in the art from the following detailed description of embodiments of the invention, when read with the drawings and appended claims.

BRIEF DESCRIPTION OF THE DRAWINGS

FIG. 4 illustrates frames in a dual channel system designated as even or odd based on when the frames are transmitted in relation to system time slots.

FIG. 5 illustrates a series of signaling messages being transmitted over a channel in a single or multiple channel communication link.

FIG. 8($b$) illustrates an example sequence diagram of the MAR messaging protocol for forward link transmissions when the mobile station is idle (in standby mode) according to one embodiment of the present invention.

FIG. 8($c$) illustrates an example sequence diagram of the MAR messaging protocol for forward link transmissions when the MS is first idle (in standby mode), but later becomes active according to one embodiment of the present invention.

FIG. 8($d$) illustrates an example sequence diagram of MAR messaging in the context of a Radio Link Protocol (RLP) SYNC/ACK messaging exchange for configuring forward link transmissions when the connection is active according to one embodiment of the present invention.

DETAILED DESCRIPTION OF PREFERRED EMBODIMENTS

Figure 1:
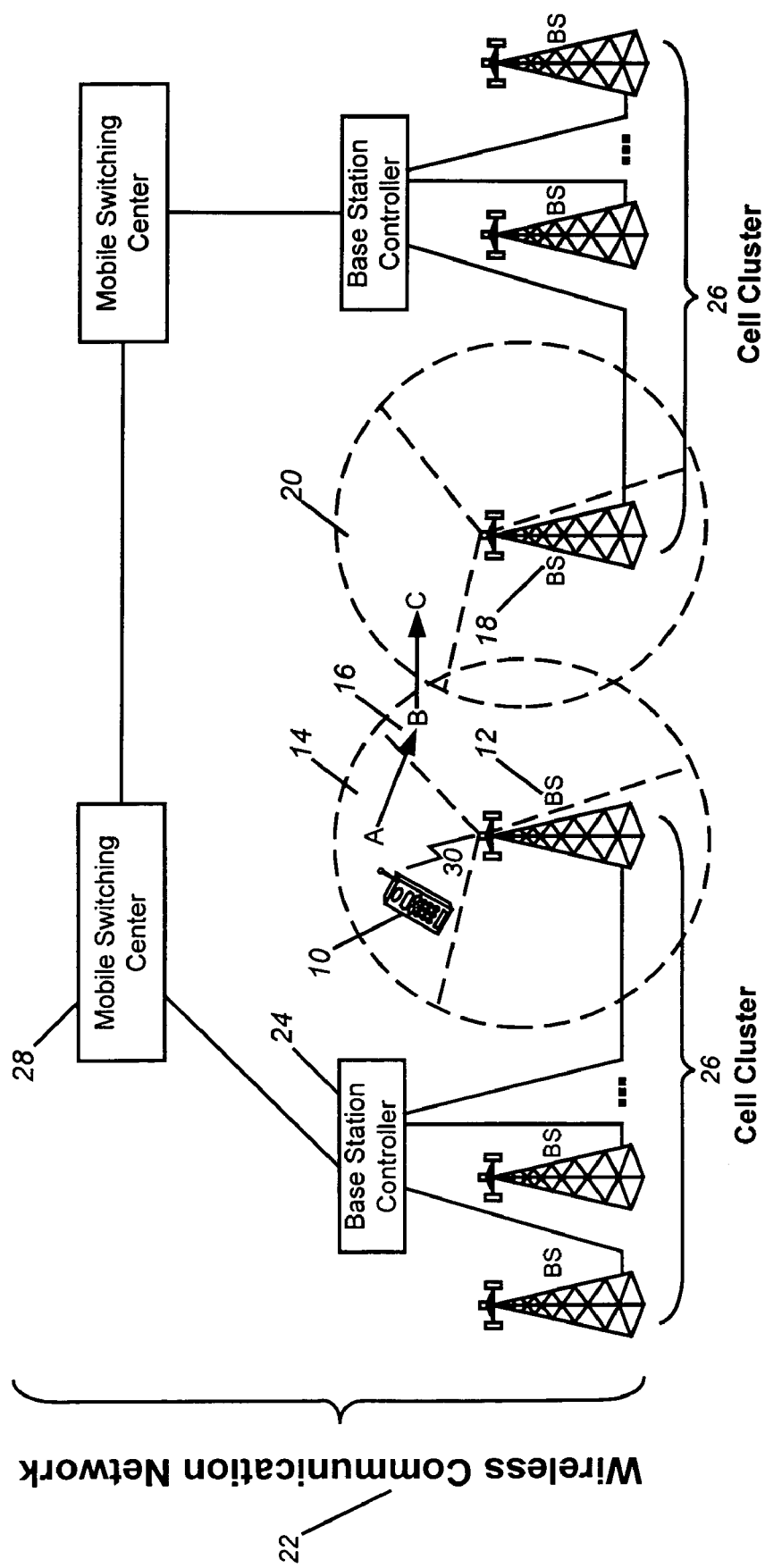
FIG. 1 illustrates an example system environment including a mobile station capable of maintaining a connection with a cellular communication network as the mobile station roves through a geographic area served by the cellular communication network.
Figure 2:
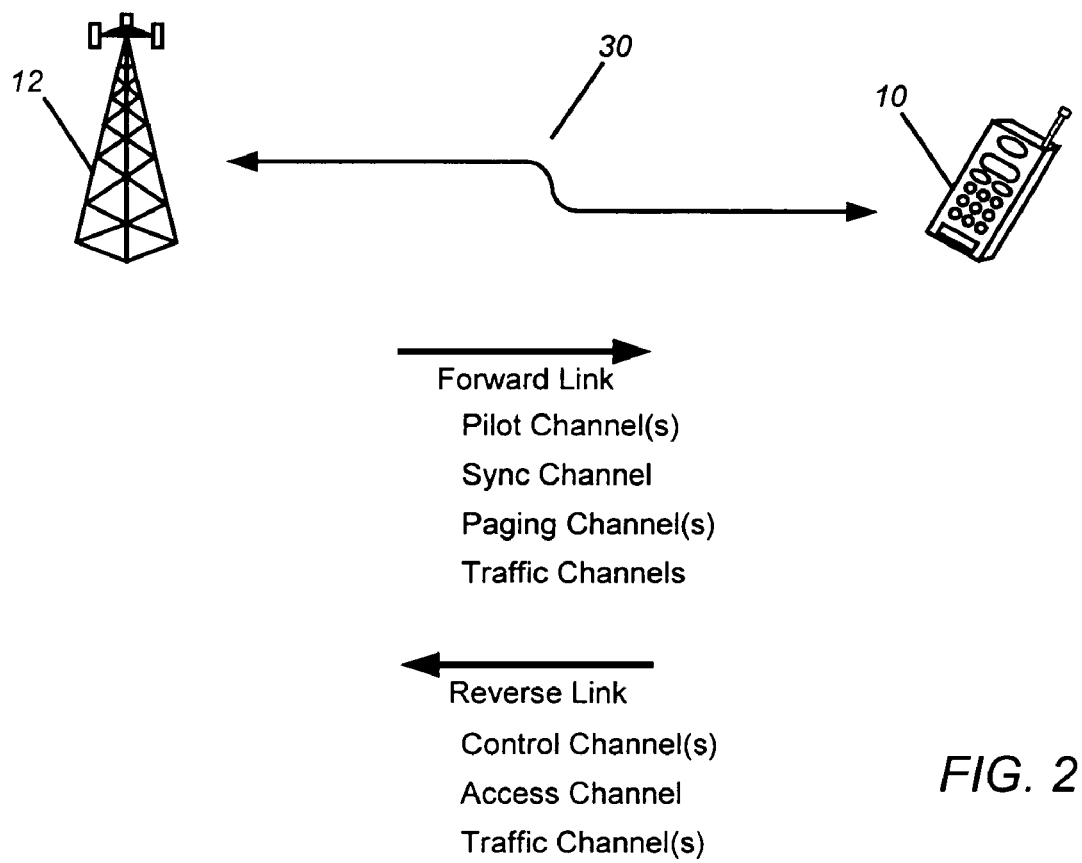
FIG. 2 illustrates an exemplary communication link between a mobile station and a base station in a wireless communication system.
Figure 3:
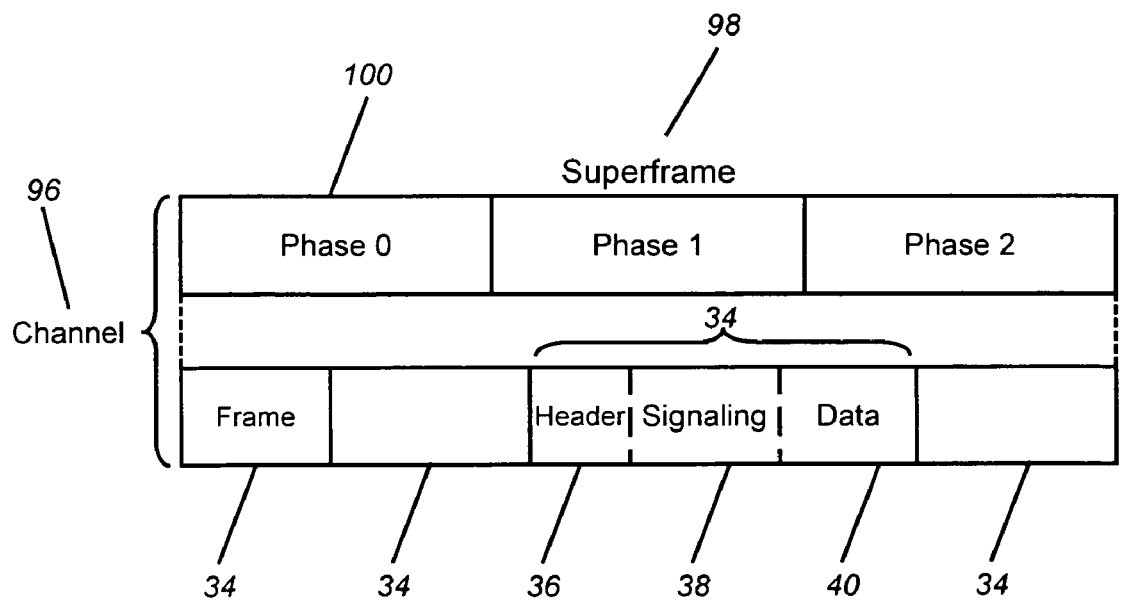
FIG. 3 is a timeline of a superframe divided into three phases and four frames for use in a wireless communication system.

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

It should be further understood that although the description provided herein may primarily reference the CDMA communication protocol (code-based protocols) and the communication of messages for purposes of explanation only, embodiments of the present invention are applicable to other communication protocols and digital radio technologies generally, and include, but are not limited to, CDMA, TDMA, FDMA, GSM, GPRS, and the like. Furthermore, in addition to the communication of messages, other types of information blocks, frames or packets used in the communication of information fall within the scope of the present invention.

Poor connections result in the improper transmission of information. For example, if information is communicated in discrete messages, a poor connection can lead to the improper receipt of messages. If the receiving entity is able to notify the transmitting entity of the improperly received messages and request retransmission of those messages via the second type of ARQ parameter (described hereinabove), the transmitting entity may be able to re-transmit the messages. However, if the conditions that created the poor connection are persistent, the re-transmitted messages still may not be properly received. Additional ARQ parameters of the second type may be sent by the receiving entity, and the transmitting entity may continue to re-transmit the messages, but if they are not properly received, the continued re-transmission of messages can lead to latency problems in the connection. To minimize the latency created by the continued re-transmission of messages, embodiments of the present invention limit the number of the second type of ARQ parameters or the number of re-transmissions of messages using MAR values, which represent the maximum number of allowed retransmissions.

Assignments of MAR Values

In typical communications between a MS and a BS, only one channel is active at any one time, but the channel may have a varying data rate over time. For example, as the MS moves about through a network and nears the BS, a higher data rate (a function of the modulation and coding schemes) may be possible because of the improving connection quality. Conversely, lower data rates may be more appropriate for connections of poorer quality. At each of these data rates, a particular MAR value may be appropriate to minimize latency and maximize the efficiency of the overall connection. The present invention is based on the recognition that the selection of an appropriate MAR value may be dependent on the current data rate of the channel. Thus, embodiments of the present invention enable different MAR values to be assigned across a range of possible data rates.

In addition to the data rate, the choice of a MAR value for a particular data rate may also be influenced by the number of bits reserved for the sequence number, the frame size, the amount of memory available, and the like. For example, the larger the MAR, the more bits are generally required to support the ARQ method and thus the larger the overhead. Also, memory available for retransmission counts and sequence number status limits the maximum number of retransmissions. In general, a preferred assignment of MAR values across the range of possible data rates may be determined based on statistics, history of past experiences, or current conditions. In other words, statistics and history of past experiences can be used to empirically determine what MAR values work best for particular data rates and conditions. Current MAR values may be selected by searching for similar or equivalent conditions in the past and applying the best MAR values that were statistically or empirically determined. By assigning multiple MAR values over a range of possible data rates, an efficient distribution of MAR values can be assigned to the range of possible data rates to minimize the overall latency of the communication link.

MAR Messages

Figure 6:
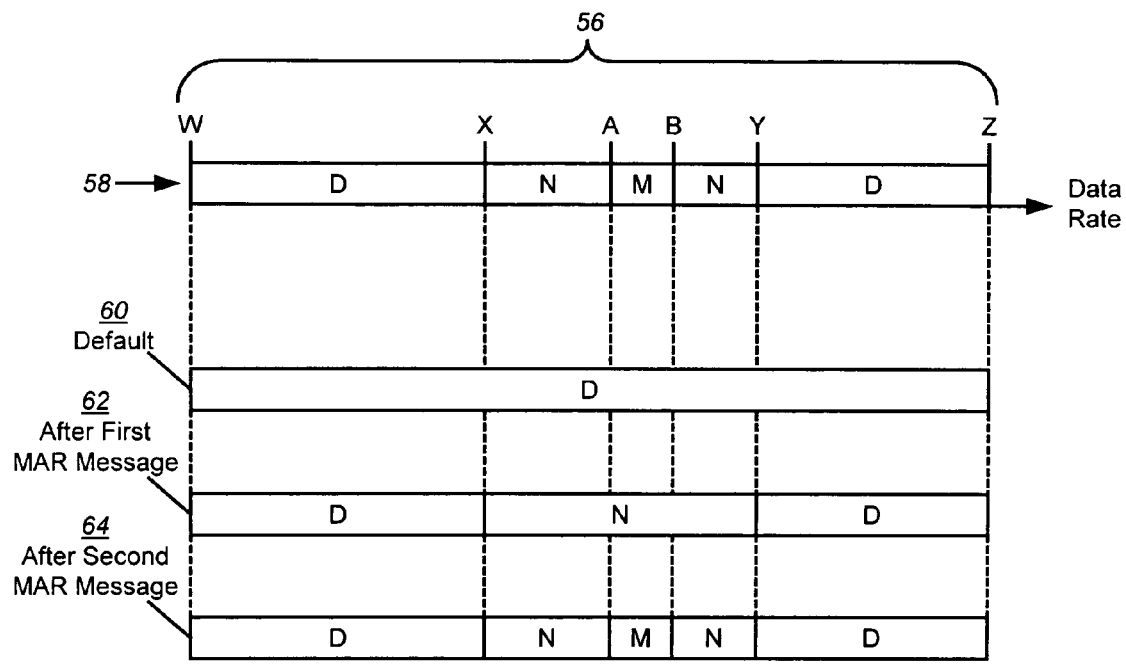
FIG. 6 illustrates an example assignment of maximum allowable retransmission (MAR) values over a range of possible data rates for a communication link, and the use of MAR messages to create the assignment of MAR values according to an embodiment of the present invention.

FIG. 6 illustrates an exemplary range of possible data rates 56 for a communication channel, where W is the lowest possible data rate and Z is the highest possible data rate. In addition, FIG. 6 illustrates an example assignment of MAR values D, N and M over the range of possible data rates (see reference character 58). Embodiments of the present invention utilize MAR messages to efficiently create the assignment of MAR values over the range of possible data rates. This assignment of MAR values may be stored in the receiving entity and used to limit the number of retransmission requests sent by the receiving entity, or may be stored in the transmitting entity and used to limit the number of retransmitted messages sent by the transmitting entity.

Figure 7:
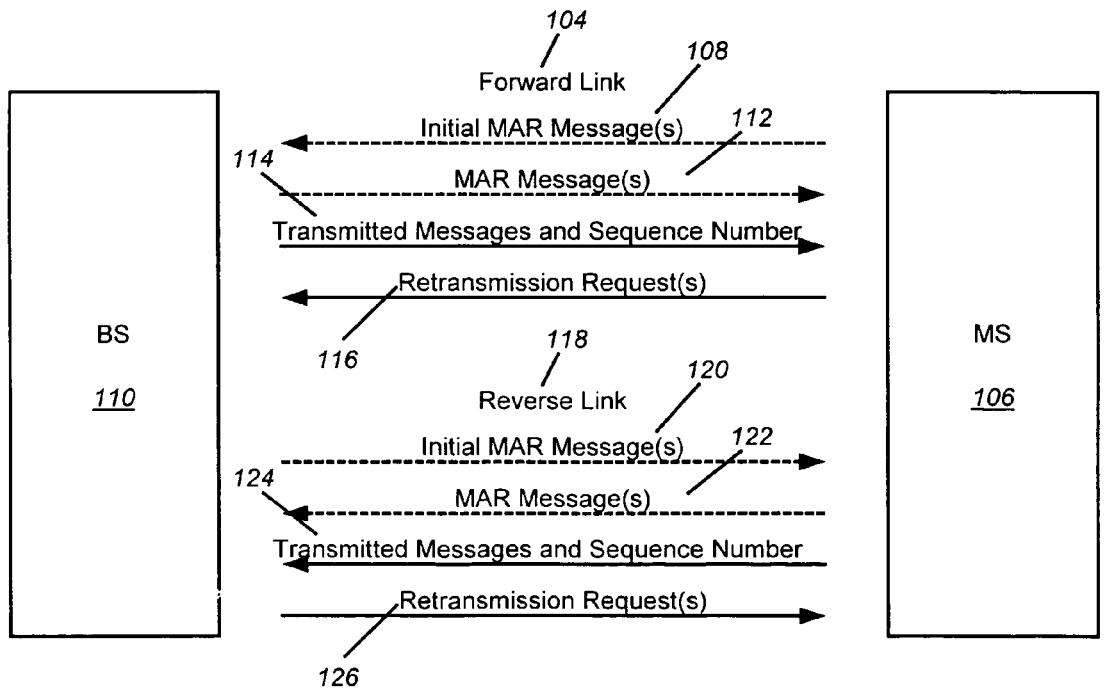
FIG. 7 illustrates control over forward and reverse link message retransmissions using MAR messages according to one embodiment of the present invention.

FIG. 7 illustrates control over forward and reverse link message retransmissions using MAR messages according to one embodiment of the present invention. Referring to the forward link 104, MAR messages may utilize a negotiation process, with either the transmitting entity (the BS 110) or the receiving entity (the MS 106) being the final arbiter of the assignment of MAR values. For example, in the case where the assignment of MAR values is stored in the MS 106, and therefore limits the number of retransmission requests sent by the MS 106, at the start of the connection the MS 106 may first send one or more initial MAR messages 108 to the BS 110 containing information related to the MS's initial assignment of MAR values over the range of possible data rates for the forward link. This initial assignment of MAR values may be determined based on statistics, history of past experiences, or current conditions known by the MS 106. The BS 110 may also store its own assignment of MAR values over the range of possible data rates for the forward link, which may be based on statistics, history of past experiences, or current conditions known by the BS 110. The BS 110 may "negotiate" the information in the initial MAR messages 108 with its own assignment of MAR values, resolve any conflicts, and transmit one or more MAR messages 112 back to the MS 106 containing information related to the assignment of MAR values over the range of possible data rates for the forward link. For example, when differences exist between the MS 106 and the BS 110, the BS's own assignment of MAR values may overrule the MS. However, if the MS 106 has insufficient memory to accommodate the BS's assignment of MAR values, the MS's initial assignment of MAR values may completely overrule the BS, or some of the BS's assignments (e.g. starting from the highest data rates, and proceeding downward) may be overruled by the MS until the memory problems are resolved. If the BS 110 is the final arbiter of the assignment of MAR values, these MAR messages 112 will be accepted by the MS 106 as the assignment of MAR values. However, if the MS 106 is the final arbiter, these MAR messages may be further "negotiated" by the MS 106 before the assignment of MAR values is generated.

In another embodiment of the present invention not illustrated in FIG. 7, there may be no negotiation process in the forward link. No initial MAR messages will be sent from the MS to the BS. Instead, the BS will use its own assignment of MAR values over the range of possible data rates for the forward link to send one or more MAR messages back to the MS containing information related to the assignment of MAR values.

In either case, once the assignment of MAR values has been received and stored by the MS 106, the BS 110 can commence transmitting messages over the forward link (see reference character 114) with sequence numbers assigned in accordance with an embedded ARQ parameter of the first type, as discussed above. Thereafter, the MS 106 will use the received sequence numbers to detect improperly received messages and request retransmission of these messages 116 using negative acknowledgement ARQ parameters of the second type (or the MS will limit BS retransmission by using positive acknowledgement ARQ parameters of the second type for messages it never received properly), discussed above. However, these retransmission requests 116 will be limited in accordance with the current data rate of the forward link and the assignment of MAR values stored in the MS 106.

In an embodiment of the present invention (not shown in FIG. 7) where the assignment of MAR values is stored in the BS, and therefore limits the number of retransmitted messages sent by the BS, a process similar to the one described above is employed to determine the assignment of MAR values. However, in this embodiment, the BS may send initial MAR messages to the MS, where these initial MAR messages may be negotiated with the MS's own assignment of MAR values. The MS may then send one or more MAR messages back to the BS, representing the negotiated assignment of MAR values. The BS may use these MAR messages to store the assignment of MAR values, or may further negotiate these MAR messages before generating and storing the assignment of MAR values.

Once the assignment of MAR values has been received and stored by the BS, the BS can commence transmitting messages over the communication link with sequence numbers assigned in accordance with embedded ARQ parameters of the first type. Thereafter, the MS will use the received sequence numbers to detect improperly received messages and request retransmission of these messages using negative acknowledgement ARQ parameters of the second type (or the BS will implicitly detect improperly received messages using positive acknowledgement ARQ parameters of the second type). However, message retransmissions by the BS will be limited in accordance with the current data rate of the communication link and the assignment of MAR values stored in the BS.

Note that in a typical communication link such as the one illustrated in FIG. 7, both the forward and reverse links will be active. Thus, at the start of a connection, independently but at approximately the same time, a negotiation process similar to the one described above with respect to the forward link 104 may occur with respect to the reverse link 118 (see MAR messages 120 and 122). The independence of the forward and reverse links means that the BS and MS may have different assignments of MAR values over the range of possible data rates.

In an embodiment of the present invention shown in FIG. 7 where the assignment of MAR values is stored in the BS 110, once the assignment of MAR values has been received and stored by the BS 110, the MS 106 can commence transmitting messages over the reverse link (see reference character 124) with sequence numbers assigned in accordance with an embedded ARQ parameter of the first type, as discussed above. Thereafter, the BS 110 will use the received sequence numbers to detect improperly received messages and request retransmission of these messages 126 using negative acknowledgement ARQ parameters of the second type (or the BS will limit MS retransmission by using positive acknowledgement ARQ parameters of the second type for messages it never received properly), discussed above. However, these retransmission requests 126 will be limited in accordance with the current data rate of the reverse link and the assignment of MAR values stored in the BS 110.

In another embodiment of the present invention (not shown in FIG. 7) where the assignment of MAR values is stored in the MS, once the assignment of MAR values has been received and stored by the MS, the MS can commence transmitting messages over the communication link with sequence numbers assigned in accordance with embedded ARQ parameters of the first type. Thereafter, the BS will use the received sequence numbers to detect improperly received messages and request retransmission of these messages using negative acknowledgement ARQ parameters of the second type (or the MS will implicitly detect improperly received messages using positive acknowledgement ARQ parameters of the second type). However, message retransmissions by the MS will be limited in accordance with the current data rate of the communication link and the assignment of MAR values stored in the MS.

It should be understood that the forward and reverse links may employ dual or multiple channels, and the process of determining an assignment of MAR values may be independently repeated at the start of the connection for each of the channels. In addition, while the connection is active, each of the channels, acting independently, may detect improperly received messages and communicate ARQ parameters of the second type back to the transmitting entity to enable the messages to be retransmitted, subject to the retransmission limitations defined by the assignment of MAR values.

In embodiments of the present invention the MAR messages described above may be communicated in independent messages, or they may be embedded in messages such as synchronization messages or other types of negotiation messages.

Each MAR message described above specifies a particular MAR value, and may include a data rate or a range of data rates. In one embodiment, a basic MAR message contains the following information fields:

[MAR value] [LLDR] [ULDR], where LLDR stands for lower limit data rate and ULDR stands for upper limit data rate. By sequencing the transmission of a set of MAR messages, an assignment of MAR values over the range of data rates can be generated. It should be understood that if LLDR and ULDR are equal, only one data rate is specified. Thus, the term "range of data rates," as used herein, may include one data rate as well as a range of data rates.

In one embodiment, when a connection is first established, the range of data rates is set to a default MAR value (e.g., 9 or 12) or a set of default MAR values that vary over the range of data rates. Referring again to the example of FIG. 6, the range of data rates initially has a single default MAR value D (see reference character 60). The transmitting entity may then send one or more MAR messages in a particular sequence to the receiving entity to override the default MAR values and create the assignment of MAR values at the start of the connection.

In the example of FIG. 6, a MAR message may be transmitted, assigning a MAR value of N to the range of data rates X to Y, resulting in the assignment shown at 62. Note that the MAR message overrides the existing assignment of MAR values within the range of data rates specified in the MAR message. A second MAR message may then be transmitted, assigning a MAR value of M to the range of data rates A to B, resulting in the assignment shown at 64, which is the same as the assignment of MAR values 58. Note that the second MAR message overrides the existing assignment of MAR values within the range of data rates specified in the second MAR message. In particular, the second MAR message overrides the first MAR message wherever the range of data rates in the first and second messages overlaps (between A and B in the example of FIG. 6), so the order of the MAR messages is important.

As noted above, the MAR messages are initially received and processed at the start of a connection to generate an assignment of MAR values. However, in another embodiment of the present invention, either the transmitting entity or the receiving entity, or both, may compile information during the course of the connection regarding improperly received messages and the data rate associated with those messages. This information may include, for example, a statistical distribution of the number of retransmissions for messages, frames or packets correlated with conditions, data rate and other parameters. This would facilitate selection of MAR value based on statistics and past history. New MAR messages may then be communicated during the course of the connection for updating the assignment of MAR values.

For example, new MAR messages may be transmitted to balance the loading in the various communications layers defined in the Open Systems Interconnection (OSI) Reference Model. If messages are being lost in the physical layers, these messages can be retransmitted as described above. However, if the message is unsuccessfully retransmitted the maximum allowable number of times (i.e. the MAR value for the current data rate is reached), recovery may be pushed to higher layers such as at the TCP/IP layer. At this higher layer, the entire packet may be retransmitted. If packet retransmission is unsuccessful, recovery can again be pushed to the next higher layer, where the application may download the file again, for example. During a connection, the transmitting entity may determine that the load (including packet retransmissions) at the TCP/IP layer is too high, and as a result will send a new MAR message to the receiving entity, increasing the MAR value so more retransmissions will be allowed at the physical layers for certain data rates.

Other Types of MAR Messages

The basic MAR message, described earlier, specified a particular MAR value over a particular range of data rates, and thus contained the following basic information fields:

[MAR value] [LLDR] [ULDR], where LLDR stands for lower limit data rate and ULDR stands for upper limit data rate. However, in other embodiments of the present invention, other MAR messages may be employed that contain one or more of the following fields:

[MAR value] [LLDR flag] [ULDR flag] [LLDR] [ULDR].

In one embodiment of the present invention, these fields may be utilized as shown in the following table:

TABLE 1

| MAR value | LLDR flag | ULDR flag | LLDR | ULDR | Result |
|---|---|---|---|---|---|
| # | 0 | 0 | X [or DR range indicator] | X | Assign MAR value to entire DR range [or use DR range indicator in lookup table to determine DR range] |
| # | 0 | 1 | X | ULDR | Assign MAR value to a DR range having an upper limit of ULDR |
| # | 1 | 0 | LLDR | X | Assign MAR value to a DR range having a lower limit of LLDR |
| # | 1 | 1 | LLDR | ULDR | Assign MAR value to a DR range having a lower limit of LLDR and an upper limit of ULDR |

In the first row, where LLDR flag=0 and ULDR flag=0, in one embodiment LLDR and ULDR could be set to X (don't care), and the MAR value (designated by a #) could be assigned to the entire range of data rates. In such an embodiment, there is no need to send the LLDR or ULDR if there is a pre-arranged interpretation of LLDR and ULDR to be used when the respective flags are set to '0'. This may be used to assign a default MAR value to the entire range of data rates. Alternatively, either the LLDR field (shown) or the ULDR field (not shown) could contain a DR range indicator. This DR range indicator could be used as an entry to a lookup table stored in the transmitting entity, which could provide a corresponding range of data rates, a single data rate, an upper limit of the data rate range, or a lower limit of the data rate range, or it could be used as part of a computation to derive a range of data rates.

In the second row, where LLDR flag=0 and ULDR flag=1, ULDR would contain the upper limit of the data rate range. The lower limit could be defaulted to the lowest possible data rate, some predetermined lower limit, the upper limit divided or subtracted by some number, or some other predetermined relationship with the upper limit. Note that it is generally more efficient to send a MAR message with flags and implied limits than a MAR message using explicit data fields.

In the third row, where LLDR flag=1 and ULDR flag=0, LLDR would contain the lower limit of the data rate range. The upper limit could be defaulted to the highest possible data rate, some predetermined upper limit, the lower limit multiplied by or added to some number, or some other predetermined relationship with the lower limit.

In the fourth row, where LLDR flag=1 and ULDR flag=1, if LLDR is less than ULDR, then LLDR would contain the lower limit of the data rate range, and ULDR would contain the upper limit of the data rate range. If LLDR is greater than ULDR, then the given MAR value could be assigned from LLDR to the highest possible data rate, and also from the lowest possible data rate to ULDR (i.e. a "wrap-around" feature). If LLDR=ULDR, then the given MAR value would be assigned to the single data rate given by LLDR and ULDR.

In an alternative embodiment, a MAR message could specify two different data rate ranges using the following fields:

[LL1DR flag] [UL1DR flag] [LL1DR] [UL1DR]
[LL2DR flag] [UL2DR flag] [LL2DR] [UL2DR], where LL1 and UL1 designate fields used to define the first range, and LL2 and UL2 designate fields used to define the second range. This concept can easily be extended to multiple ranges.

In a further embodiment, a MAR message could specify more than one MAR value, and include one or more fields and flags associated with each MAR value for specifying the data rate ranges for that MAR value.

It should be understood that the fields and tables described above are only examples of how such functionality might be implemented, and that other methods for assigning a MAR value to a range of data rates fall within the scope of the present invention.

Figure 8A:
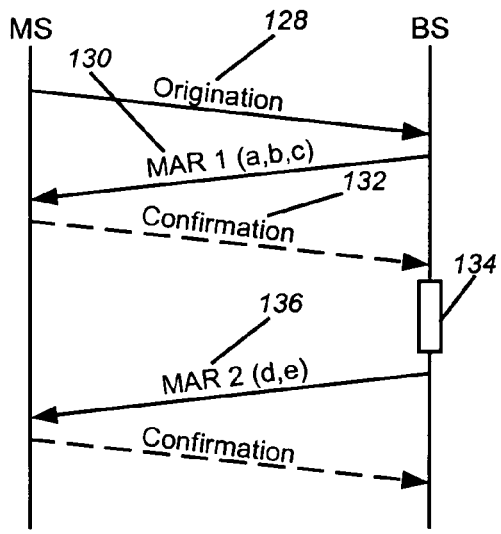
FIG. 8($a$) illustrates an example sequence diagram of the MAR messaging protocol for forward link transmissions when the connection is being negotiated according to one embodiment of the present invention.

FIG. 8(a) illustrates an example sequence diagram of the MAR messaging protocol for forward link transmissions when the connection is being negotiated according to one embodiment of the present invention. FIG. 8(a) shows a MS-initiated connection wherein the MS first sends an origination message 128 to a BS over an access channel, requesting access to the network. The BS may respond directly with resource assignments or temporary resources (such as a default configuration) to be used temporarily to further negotiate or configure the connection. Alternatively, the BS may immediately begin configuration or negotiation. The BS responds by sending a first MAR message (MAR 1) 130 containing three data rate ranges, a, b, and c. The MS acknowledges receipt of the first MAR message by sending a confirmation message 132. The connection configuration may then be completed and proceed. After some delay 134, when conditions change, the BS sends a second MAR message (MAR 2) 136 containing two data rate ranges d and e that override, in sequential order, the MAR value assignments only for those data rate ranges d and e.

Figure 8B:
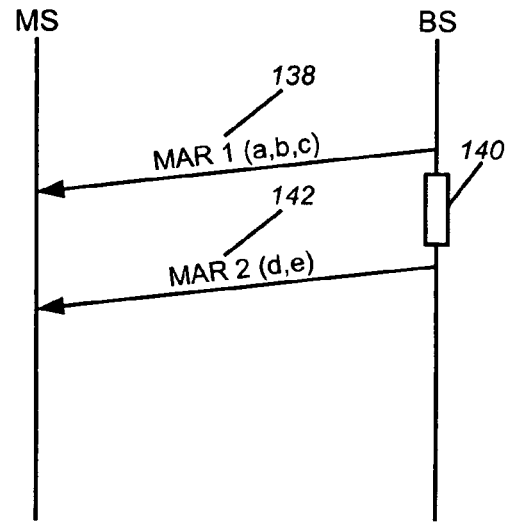

FIG. 8(b) illustrates an example sequence diagram of the MAR messaging protocol for forward link transmissions when the MS is idle (in standby mode) according to one embodiment of the present invention. While the MS is idle, the BS sends a first MAR message (MAR 1) 138 containing three data rate ranges, a, b, and c. After some delay 140, when conditions change but the MS is still idle, the BS sends a second MAR message (MAR 2) 142 containing two data rate ranges d and e that override, in sequential order, the MAR value assignments only for those data rate ranges d and e. Note that because the MS is idle, no confirmation messages will be sent back to the BS. Additionally, in idle, the MS may be monitoring a common channel and the BS may configure multiple MSs at the same time using the same messages. This is typical of overhead messages on common channels.

Figure 8C:
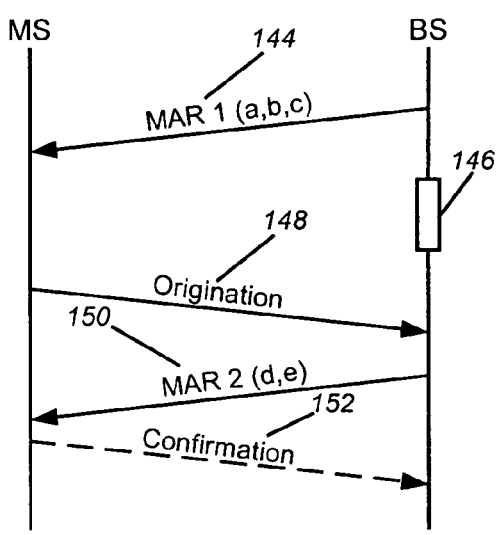

FIG. 8(c) illustrates an example sequence diagram of the MAR messaging protocol for forward link transmissions when the MS is first idle (in standby mode), but later becomes active according to one embodiment of the present invention. While the MS is idle, the BS sends a first MAR message (MAR 1) 144 containing three data rate ranges, a, b, and c. Note that in idle state, the MAR 1 message may be directed to multiple MSs and thereby establish a default. After some delay 146, the MS then sends an origination message 148 to a BS over an access channel, requesting access to the network. When conditions change or when a mobile station's capabilities, preferences or QoS requirements differ significantly from that considered in establishing the default configuration sent in MAR 1 (or independently), the BS sends a second MAR message (MAR 2) 150 containing two data rate ranges d and e that override, in sequential order, the MAR value assignments only for those data rate ranges d and e. The MS acknowledges receipt of the second MAR message by sending a confirmation message 152. This example sequence shows how a very efficient protocol exchange can be designed sending some configuration information to multiple MSs in idle mode over a common channel and thereafter refining the individual configurations with typically less resource usage in active state on a dedicated channel(s). I.e., MAR 2 may be different for different MSs while MAR 1 is commonly received by a number of MSs monitoring the common channel it is sent on.

Figure 8D:
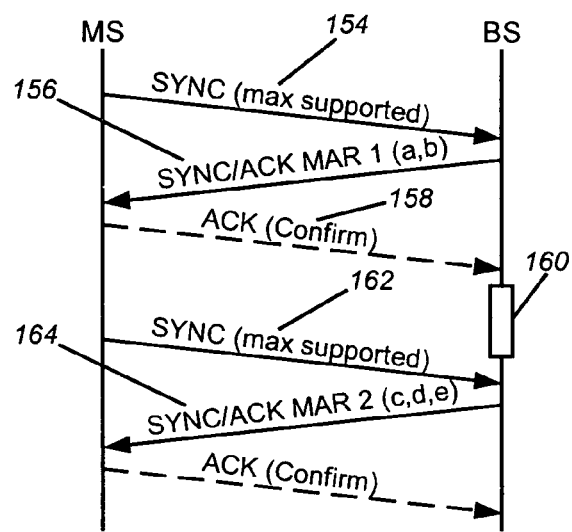

FIG. 8(d) illustrates an example sequence diagram of MAR messaging in the context of a Radio Link Protocol (RLP) SYNC/ACK messaging exchange for configuring forward link transmissions when the connection is active according to one embodiment of the present invention. Note that reverse link transmissions can be configured in the same way or even at the same time. FIG. 8(d) shows a MS communicating a SYNC message 154 to a BS, wherein the SYNC message contains the equivalent of a pre-negotiated MAR message in which an array of MAR values for a range of data rates is specified (as opposed to a single MAR value for the range of data rates in the existing RLP protocol). The BS responds by sending a first SYNC/ACK MAR 1 message 156 containing two data rate ranges, a and b. The MS acknowledges receipt of the first SYNC/ACK MAR 1 message by sending an ACK (confirm) message 158. After some delay 160, when conditions change, the MS may send a second SYNC message 162 to the BS, and the BS may send a second SYNC/ACK MAR 2 message 164 containing three data rate ranges c, d and e that override, in sequential order, the MAR value assignments only for those data rate ranges c, d and e.

Efficient Ordering of MAR Messages

Referring again to the example of FIG. 6, it was demonstrated earlier that two basic MAR messages, one assigning a MAR value of N to the range of data rates X to Y, and one assigning a MAR value of M to the range of data rates A to B, will result in the assignment of MAR values 58. Note that it would also have been possible to send three basic MAR messages, one to assign the value N between X and A, one to assign the value M between A and B, and one to assign the value N between B and Y, but this is less efficient than sending two basic MAR messages as previously described.

Embodiments of the present invention utilize methodologies capable of being implemented in software or hardware in either the receiving entity, the transmitting entity, or both, for creating the assignment of MAR values using an efficient sequence of MAR messages.

Figure 9:
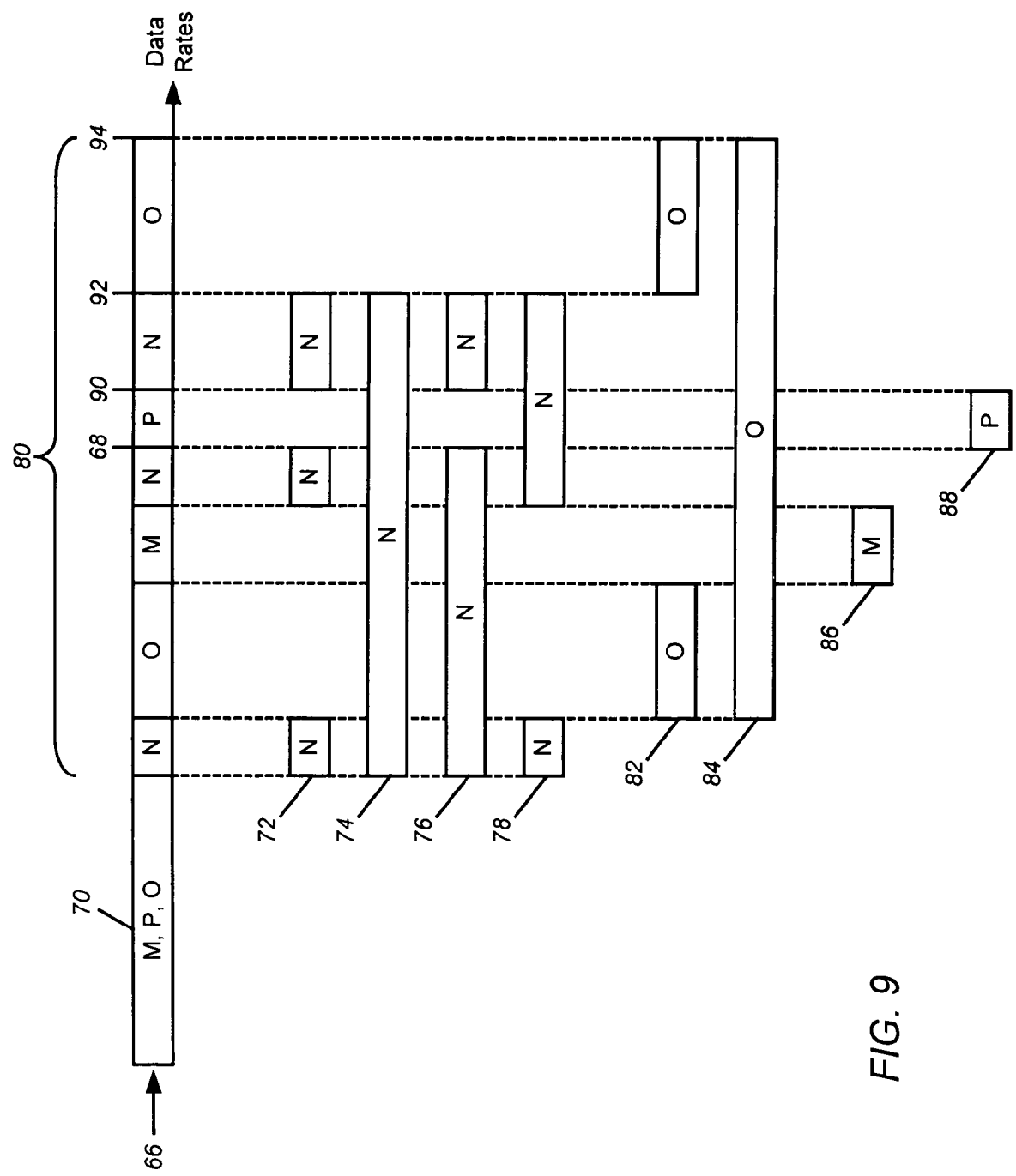
FIG. 9 illustrates an example preferred assignment of MAR values over a range of possible data for a communication link, and an "enumeration" embodiment of the present invention wherein all of the sequences for creating each of the MAR values are enumerated, and all possible combinations of these sequences are tried in all possible orders, with the combination and order that yields the preferred assignment of MAR values in the most efficient manner being selected.

In the example of FIG. 9, the assignment of MAR values N, M, O and P over the range of data rates 80 is shown at 66. Note that another portion of the data rate range shown at consists of MAR values M, O and P, but their actual distribution over the range 70 is unimportant in this example. Focusing only on the range 80 for the moment, four different basic MAR message sequences could be used to assign N, as indicated at 72, 74, 76 and 78. In the first sequence 72, three separate basic MAR messages are needed. In the second sequence 74, only one basic MAR message is used. In the third and fourth sequences 76 and 78, two basic MAR messages are employed. Similarly, two different MAR message sequences comprising either one or two basic MAR messages could be used to assign O, as indicated at 82 and 84. A single basic MAR message could be used to assign M and P, as indicated at 86 and 88.

Only certain combinations of these sequences, in a certain order, would create the assignment of MAR values 66 over the range 80. For example, sequence 84, followed by sequences 78, 86, and 88, in that order, would create the assignment of MAR values 66 over the range 80. However, sequence 78, followed by sequences 84, 86, and 88, in that order, would not create the assignment. Thus, in an "enumeration" embodiment of the present invention, all of the sequences for creating each of the MAR values could be enumerated. All possible combinations of these sequences could then be tried in all possible orders, and the combination and order that yields the assignment of MAR values 66 in the most efficient manner would be selected. MAR messages would then be transmitted in accordance with the selected combination and order of sequences to produce the assignment of MAR values 66. Note that the above examples used basic MAR messaging. If different types of MAR messages are considered, then the number of possible sequences that yield the assignment of MAR values 66 will increase, as will the number of possible combinations and sequence orders.

Rather than enumerating and trying all possible combinations of sequences, the entity transmitting the MAR messages may apply certain rules to make the process of determining what MAR messages to send more efficient. For example, in a "MAR value coverage" embodiment of the present invention, the most efficient sequence for assigning the MAR value with the most discrete entries may be transmitted first. In the example of FIG. 9, the MAR value N has the most discrete entries (three), so the most efficient sequence of MAR messages to assign the N MAR value is transmitted first (the one message sequence 74 in the example of FIG. 9). Thereafter, all possible combinations of the remaining possible sequences (sequences 82, 84, 86 and 88 in the example of FIG. 9) could then be tried in all possible orders, and the combination and order that yields the assignment of MAR values 66 in the most efficient manner would be selected.

In another "MAR value coverage" embodiment, the most efficient sequence for assigning the MAR value spread out over the widest data rate range may be transmitted first. In the example of FIG. 9, the MAR value O is spread out over the widest data rate range, so the most efficient sequence of MAR messages to assign the O MAR value is transmitted first (the one message sequence 84 in the example of FIG. 9). Thereafter, all possible combinations of the remaining possible sequences (sequences 72, 74, 77, 78, 86 and 88 in the example of FIG. 9) could then be tried in all possible orders, and the combination and order that yields the assignment of MAR values 66 in the most efficient manner would be selected. Alternatively, the most efficient sequence for assigning the MAR value covering the most data rates may be transmitted first.

In a "MAR pattern recognition" embodiment of the present invention, a table or mapping of MAR value patterns and efficient sequences of MAR messages used to generate the MAR value patterns may be maintained, and when a MAR pattern is recognized, the table can be searched to identify the corresponding efficient sequence of MAR messages. For example, the MAR pattern A-B-A might be known to be efficiently implemented by a single MAR message for A, followed by a single MAR message for B. In the example of FIG. 9, the MAR pattern N-P-N may be recognized, and thereafter a single MAR message for N, followed by a single MAR message for P will be transmitted.

Other efficient methodologies according to embodiments of the present invention take into account the type of MAR message being communicated. For example, the MAR pattern P-N-O in FIG. 9, bounded by data rates 68, 90, 92 and 94, may be assigned using three basic MAR messages, one for each MAR value, where each basic MAR message specifies the lower limit data rate and the upper limit data rate. One MAR message will specify the MAR value P and the data rates 68 and 90, one MAR message will specify the MAR value N and the data rates 90 and 92, and one MAR message will specify the MAR value 0 and the data rates 92 and 94. However, if MAR messages of the type indicated in the third row of Table 1 above are available and the upper limit data rate is defaulted to data rate 94, the first message will specify the MAR value P and the data rate 68, the second MAR message will specify the MAR value N and the data rate 90, and the third MAR message will specify the MAR value 0 and the data rate 92. The elimination of data fields makes the messaging more efficient.

It should be understood that the "enumeration", "MAR value coverage," and "MAR pattern recognition" methodologies may be employed alone, or combined in a sequence as portions of the assignment of MAR values are created. For example, the "MAR value coverage" methodology may be used initially to define a portion of the preferred assignment of MAR values, and the "MAR pattern recognition" methodology may thereafter be used to "fill in the holes" and define the remainder of the assignment of MAR values. These methodologies are also influenced by the type of MAR messages available.

Furthermore, these methodologies may be independently applied to sections of the range of data rates. In the example of FIG. 9, after MAR values are assigned to the range of data rates 80, focus may shift to the range of data rates 70, and the process of determining an efficient sequence of MAR messages can be repeated.

Although the methodologies for limiting the number of re-transmissions of messages using MAR values and messages described hereinabove used a cellular network as an example, the basic concepts of limiting the number of re-transmissions of messages using MAR values and messages are applicable to or may be extended to other parameters, wireless protocols and technologies such as paging systems, satellite communication systems, cordless phone systems, fleet communication systems, and the like. The concept of a BS described herein encompasses repeaters or different antenna diversity schemes, a cordless base, a satellite or another telephone, and the like. The concept of a MS described herein encompasses a pager, a satellite phone, a cordless phone, a fleet radio, a wireless terminal device, a Telematics modem, and the like.

For example, in IS-2000, the MS transmits the pilot channel to the BS to help the BS demodulate transmissions from the MS. Generally, the stronger the pilot channel, the easier it is for the BS to demodulate transmissions from the MS. However, there is a tradeoff, because it is generally inefficient to allocate power to a channel such as the pilot channel that does not carry information. There is a power level for the pilot channel known as a reverse-link pilot channel gain that attempts to balance the competing interests, and it varies according to the data rate of the forward link. Thus, in IS-2000, there is a fixed assignment of reverse-link pilot channel gain over the range of possible data rates for the forward link. However, the concepts of the present invention may be employed to assign multiple reverse-link pilot channel gain values across a range of possible data rates using pilot channel gain messages.

In other example applications, each MS may be assigned one or more Walsh codes for the assignment of channels. The concepts of the present invention may be employed to assign multiple Walsh codes across a set of candidate MSs using Walsh code messages. In CDMA, different modulation schemes are allocated for use at different data rates. The concepts of the present invention may be applied to assign multiple modulation schemes across a range of possible data rates using modulation scheme messages. Different acknowledgement delays (time for sending an acknowledgement message (ACK) or a non-acknowledgement message (NAK) after receiving a frame/slot/packet) may be assigned across a range of possible data rates. The concepts of the present invention may be applied to assign an acknowledgement delay across a range of possible data rates using acknowledgement delay messages. A different number of ARQ channels may be assigned across a range of possible data rates, because more ARQ channels/slots (e.g. odd and even channels) are needed to send ACK or NAK messages at higher data rates. The concepts of the present invention may be applied to assign an number of ARQ channels across a range of possible data rates using ARQ channel messages. A different frame size may be assigned across a range of possible data rates, because as data rates increase, to keep the same number of bits within a frame, the frame size must decrease. The concepts of the present invention may be applied to assign various frame sizes across a range of possible data rates using frame size messages.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a system comprising a network and an associated mobile station (MS) for establishing a connection and maintaining a communication channel between them, both the network and the MS capable of acting as a transmitting entity and a receiving entity, the transmitting entity for transmitting messages to the receiving entity and re-transmitting messages according to an acknowledgement procedure, a method for limiting the number of retransmitted messages sent by the transmitting entity, comprising:

identifying a first assignment of one or more maximum allowable retransmission (MAR) values across a range of possible data rates for the communication channel by determining current conditions and using statistics and history of similar or equivalent conditions to select efficient MAR values over the range of possible data rates;

determining one or more first MAR messages for generating the first assignment of one or more MAR values;

receiving one or more first MAR messages, each first MAR message containing a MAR value and data rate information defining one or more ranges of data rates for the communication channel to which the MAR value in the first MAR message is assigned, each MAR value representing a maximum number of allowable retransmissions;

processing the one or more first MAR messages to generate the first assignment of one or more MAR values across the range of possible data rates for the communication channel; and limiting a number of retransmitted messages sent by the transmitting entity in accordance with a current data rate of the communication channel and the MAR value assigned to the current data rate.

2. The method as recited in claim 1, wherein the step of limiting a number of retransmitted messages sent by the transmitting entity comprises:

limiting a number of retransmission requests sent by the receiving entity in accordance with a current data rate of the communication channel and the MAR value assigned to the current data rate.

3. The method as recited in claim 1, wherein the data rate information for each first MAR message comprises:

one or more lower limit data rate fields and one or more upper limit data rate fields for defining lower and upper bounds to the one or more ranges of data rates to which the MAR value in the first MAR message is assigned; and one or more lower limit data rate flags and one or more upper limit data rate flags for identifying whether the one or more lower limit data rate fields and one or more upper limit data rate fields contain valid data, or if default values should be used.

4. The method as recited in claim 1, wherein the step of processing the one or more first MAR messages comprises, for each first MAR message received at the receiving entity:

assigning the MAR value to the one or more ranges of data rates defined in the first MAR message while overriding any MAR value previously assigned to the one or more ranges of data rates defined in the first MAR message.

5. The method as recited in claim 1, further including:

receiving the one or more first MAR messages at a start of establishment of the connection; and receiving a second set of one or more first MAR messages while the connection is active, the second set of one or more first MAR messages for updating the first assignment of one or more MAR values.

6. The method as recited in claim 5, wherein the second set of one or more first MAR messages are selected to update the first assignment of one or more MAR values in accordance with statistics compiled during the current connection.

7. The method as recited in claim 1, wherein the step of determining the one or more first MAR messages for generating the first assignment of one or more MAR values comprises:

enumerating, for each unique MAR value present in a predetermined section of the first assignment of one or more MAR values, one or more sequences of MAR messages for assigning that unique MAR value to those data rates specified in that predetermined section of the first assignment of one or more MAR values;

identifying one or more combinations of sequences of MAR messages for generating the predetermined section of the first assignment of one or more MAR values, each combination containing one sequence for every unique MAR value present in the predetermined section of the first assignment of one or more MAR values; and selecting the combination of sequences of MAR messages that can most efficiently generate the predetermined section of the first assignment of one or more MAR values.

8. The method as recited in claim 1, wherein the step of determining the one or more first MAR messages for generating the first assignment of one or more MAR values comprises:

identifying, for the MAR value with the most discrete entries in a predetermined section of the first assignment of one or more MAR values, one or more sequences of MAR messages for assigning that MAR value to those data rates specified in the predetermined section of the first assignment of one or more MAR values; and selecting the sequence of MAR messages that can most efficiently assign that MAR value to those data rates specified in the predetermined section of the first assignment of one or more MAR values, and designating this sequence of MAR messages as the first MAR messages to be transmitted in the one or more first MAR messages.

9. The method as recited in claim 1, wherein the step of determining the one or more first MAR messages for gen erating the first assignment of one or more MAR values comprises:

identifying, for the MAR value assigned over the widest range of data rates in a predetermined section of the first assignment of one or more MAR values, one or more sequences of MAR messages for assigning that MAR value to those data rates specified in the predetermined section of the first assignment of one or more MAR values; and selecting the sequence of MAR messages that can most efficiently assign that MAR value to those data rates specified in the predetermined section of the first assignment of one or more MAR values, and designating this sequence of MAR messages as the first MAR messages to be transmitted in the one or more first MAR messages.

10. The method as recited in claim 1, wherein the step of determining the one or more first MAR messages for generating the first assignment of one or more MAR values comprises:

identifying, for the MAR value assigned to the most data rates in a predetermined section of the first assignment of one or more MAR values, one or more sequences of MAR messages for assigning that MAR value to those data rates specified in the predetermined section of the first assignment of one or more MAR values; and selecting the sequence of MAR messages that can most efficiently assign that MAR value to those data rates specified in the predetermined section of the first assignment of one or more MAR values, and designating this sequence of MAR messages as the first MAR messages to be transmitted in the one or more first MAR messages.

11. The method as recited in claim 1, wherein the step of determining the one or more first MAR messages for generating the first assignment of one or more MAR values comprises:

storing a mapping of MAR value patterns and efficient sequences of MAR messages for generating the MAR value patterns; and identifying one or more MAR value patterns in the first assignment of one or more MAR values and using the mapping to determine the efficient sequence of MAR messages for generating that MAR value pattern.

12. The method as recited in claim 1, wherein the step of identifying the first assignment of one or more MAR values comprises:

receiving one or more initial MAR messages, each initial MAR message containing a MAR value and data rate information defining one or more ranges of data rates for the communication channel to which the MAR value in the initial MAR message is assigned for generating an initial assignment of MAR values across the range of possible data rates for the communication channel;

processing the one or more initial MAR messages to generate the initial assignment of MAR values;

determining current conditions and using compiled statistics and history of similar or equivalent conditions to generate a second assignment of MAR values across the range of possible data rates for the communication channel; and negotiating the initial assignment of MAR values with the second assignment of MAR values to determine the first assignment of one or more MAR values.

13. The method as recited in claim 12, wherein the step of processing the one or more initial MAR messages comprises, for each initial MAR message received:

assigning the MAR value to the one or more ranges of data rates defined in the initial MAR message while overriding any MAR value previously assigned to the one or more ranges of data rates defined in the initial MAR message.

14. The method as recited in claim 12, wherein the step of negotiating comprises overriding the initial assignment of MAR values with the second assignment of MAR values at those data rates at which a conflict exists.

15. A mobile station (MS) associated with a base station (BS) for establishing a connection and maintaining a communication channel with the BS and configured as a receiving entity for receiving messages from the BS and for performing an acknowledgement procedure for controlling a number of retransmitted messages sent by the BS if a message is not properly received, the MS comprising:

a MS processor programmed for receiving one or more first maximum allowable retransmission (MAR) messages from the BS, each first MAR message containing a MAR value and data rate information defining one or more ranges of data rates to which the MAR value in the first MAR message is assigned, each MAR value representing a maximum number of allowable retransmissions;

processing the one or more first MAR messages to generate a first assignment of one or more MAR values across the range of possible data rates for the communication channel;

configuring the acknowledgement procedure to limit the number of retransmitted messages sent by the BS in accordance with a current data rate of the communication channel and the MAR value assigned to the current data rate;

receiving the one or more first MAR messages from the BS at a start of establishment of the connection; and receiving a second set of one or more first MAR messages from the BS while the connection is active, the second set of one or more first MAR messages for updating the first assignment of one or more MAR values;

wherein the second set of one or more first MAR messages are for updating the first assignment of one or more MAR values in accordance with statistics compiled by the BS during the current connection.

16. The MS as recited in claim 15, wherein the MS processor is further programmed for processing the one or more first MAR messages by assigning, for each first MAR message received by the MS, the MAR value within that first MAR message to the one or more ranges of data rates defined in the first MAR message while overriding any MAR value previously assigned to the one or more ranges of data rates defined in the first MAR message.

17. A mobile station (MS) associated with a base station (BS) for establishing a connection and maintaining a communication channel with the BS and configured as a transmitting entity for transmitting messages to the BS and re-transmitting messages according to an acknowledgement procedure, the BS capable of receiving one or more first maximum allowable retransmission (MAR) messages from the MS for configuring the acknowledgement procedure to limit a number of retransmitted messages sent by the MS, the MS for assisting the BS in configuring the acknowledgement procedure to limit the number of retransmitted messages sent by the MS, the MS comprising:

a MS processor programmed for
identifying a first assignment of one or more MAR values across a range of possible data rates for the communication channel by determining current conditions and using statistics and history compiled by the MS processor of similar or equivalent conditions to select efficient MAR values over the range of possible data rates,
determining one or more first MAR messages for generating the first assignment of one or more MAR values, and
communicating one or more first MAR messages from the MS to the BS, each first MAR message containing a MAR value and data rate information defining one or more ranges of data rates for the communication channel to which the MAR value in the first MAR message is assigned, the one or more first MAR messages for generating the first assignment of one or more MAR values across the range of possible data rates for the communication channel.

18. The MS as recited in claim 17, wherein the data rate information for each first MAR message comprises:
one or more lower limit data rate fields and one or more upper limit data rate fields for defining lower and upper bounds to the one or more ranges of data rates to which the MAR value in the first MAR message is assigned; and
one or more lower limit data rate flags and one or more upper limit data rate flags for identifying whether the one or more lower limit data rate fields and one or more upper limit data rate fields contain valid data, or if default values should be used.

19. The MS as recited in claim 17, the MS processor further programmed for:
communicating the one or more first MAR messages from the MS to the BS at a start of establishment of the connection; and
communicating a second set of one or more first MAR messages from the MS to the BS while the connection is active, the second set of one or more first MAR messages for updating the first assignment of one or more MAR values.

20. The MS as recited in claim 19, wherein the second set of one or more first MAR messages are selected to update the first assignment of one or more MAR values in accordance with statistics compiled during the current connection.

21. The MS as recited in claim 17, the MS processor further programmed for determining the one or more first MAR messages by:
enumerating, for each unique MAR value present in a predetermined section of the first assignment of one or more MAR values, one or more sequences of MAR messages for assigning that unique MAR value to those data rates specified in that predetermined section of the first assignment of one or more MAR values;
identifying one or more combinations of sequences of MAR messages for generating the predetermined section of the first assignment of one or more MAR values, each combination containing one sequence for every unique MAR value present in the predetermined section of the first assignment of one or more MAR values; and
selecting the combination of sequences of MAR messages that can most efficiently generate the predetermined section of the first assignment of one or more MAR values.

22. The MS as recited in claim 17, the MS processor further programmed for determining the one or more first MAR messages by:
identifying, for the MAR value with the most discrete entries in a predetermined section of the first assignment of one or more MAR values, one or more sequences of MAR messages for assigning that MAR value to those data rates specified in that predetermined section of the first assignment of one or more MAR values; and
selecting the sequence of MAR messages that can most efficiently assign that MAR value to those data rates specified in the predetermined section of the first assignment of one or more MAR values, and designating this sequence of MAR messages as the first MAR messages to be transmitted in the one or more first MAR messages.

23. The MS as recited in claim 17, the MS processor further programmed for determining the one or more first MAR messages by:
identifying, for the MAR value assigned over the widest range of data rates in a predetermined section of the first assignment of one or more MAR values, one or more sequences of MAR messages for assigning that MAR value to those data rates specified in that predetermined section of the first assignment of one or more MAR values; and
selecting the sequence of MAR messages that can most efficiently assign that MAR value to those data rates specified in the predetermined section of the first assignment of one or more MAR values, and designating this sequence of MAR messages as the first MAR messages to be transmitted in the one or more first MAR messages.

24. The MS as recited in claim 17, the MS processor further programmed for determining the one or more first MAR messages by:
identifying, for the MAR value assigned to the most data rates in a predetermined section of the first assignment of one or more MAR values, one or more sequences of MAR messages for assigning that MAR value to those data rates specified in that predetermined section of the first assignment of one or more MAR values; and
selecting the sequence of MAR messages that can most efficiently assign that MAR value to those data rates specified in the predetermined section of the first assignment of one or more MAR values, and designating this sequence of MAR messages as the first MAR messages to be transmitted in the one or more first MAR messages.

25. The MS as recited in claim 17, the MS processor further programmed for determining the one or more first MAR messages by:
storing a mapping of MAR value patterns and efficient sequences of MAR messages for generating the MAR value patterns; and
identifying one or more MAR value patterns in the first assignment of one or more MAR values and using the mapping to determine the efficient sequence of MAR messages for generating that MAR value pattern.

26. The MS as recited in claim 17, the MS processor further programmed for identifying the first assignment of one or more MAR values by:
receiving one or more initial MAR messages from the BS, each initial MAR message containing a MAR value and data rate information defining one or more ranges of data rates to which the MAR value is assigned, the one or more initial MAR messages for generating an initial assignment of MAR values across the range of possible data rates for the communication channel;

processing the one or more initial MAR messages to generate the initial assignment of MAR values;

determining current conditions at the MS and using statistics and history compiled by the MS of similar or equivalent conditions to generate a second assignment of MAR values across the range of possible data rates for the communication channel; and negotiating the initial assignment of MAR values with the second assignment of MAR values to determine the first assignment of one or more MAR values.

27. The MS as recited in claim 26, the MS processor further programmed for processing the one or more initial MAR messages by:

for each initial MAR message received at the MS, assigning the MAR value to the one or more ranges of data rates defined in the initial MAR message while overriding any MAR value previously assigned to the one or more ranges of data rates defined in the initial MAR message.

28. The MS as recited in claim 26, the MS processor further programmed for negotiating the initial assignment of MAR values with the second assignment of MAR values by overriding the initial assignment of MAR values with the second of MAR values at those data rates at which a conflict exists.

29. A mobile station (MS) associated with a base station (BS) for establishing a connection and maintaining a communication channel with the BS and configured as a transmitting entity for transmitting messages to the BS and re-transmitting messages according to an acknowledgement procedure, the MS comprising:

a MS processor programmed for receiving one or more first maximum allowable retransmission (MAR) messages from the BS, each first MAR message containing a MAR value and data rate information defining one or more ranges of data rates to which the MAR value in the first MAR message is assigned, each MAR value representing a maximum number of allowable retransmissions;

processing the one or more first MAR messages to generate a first assignment of one or more MAR values across the range of possible data rates for the communication channel;

limiting a number of retransmitted messages sent by the MS in accordance with a current data rate of the communication channel and the MAR value assigned to the current data rate;

receiving the one or more first MAR messages from the BS at a start of establishment of the connection; and receiving a second set of one or more first MAR messages from the BS while the connection is active, the second set of one or more first MAR messages for updating the first assignment of one or more MAR values;

wherein the second set of one or more first MAR messages are for updating the first assignment of one or more MAR values in accordance with statistics compiled by the BS during the current connection.

30. The MS as recited in claim 29, wherein the MS processor is further programmed for processing the one or more first MAR messages by assigning, for each first MAR message received by the MS, the MAR value within that first MAR message to the one or more ranges of data rates defined in the first MAR message while overriding any MAR value previously assigned to the one or more ranges of data rates defined in the first MAR message.

31. A mobile station (MS) associated with a base station (BS) for establishing a connection and maintaining a communication channel with the BS and configured as a receiving entity for receiving messages from the BS and for performing an acknowledgement procedure for assisting the BS in controlling a number of retransmitted messages sent by the BS if a message is not properly received, the BS capable of receiving one or more first maximum allowable retransmission (MAR) messages from the MS to limit a number of retransmitted messages sent by the BS, the MS comprising:

a MS processor programmed for identifying a first assignment of one or more MAR values across a range of possible data rates for the communication channel by determining current conditions and using statistics and history compiled by the MS processor of similar or equivalent conditions to select efficient MAR values over the range of possible data rates.

determining one or more first MAR messages for generating the first assignment of one or more MAR values, and communicating one or more first MAR messages from the MS to the BS, each first MAR message containing a MAR value and data rate information defining one or more ranges of data rates for the communication channel to which the MAR value in the first MAR message is assigned, the one or more first MAR messages for generating the first assignment of one or more MAR values across the range of possible data rates for the communication channel.

32. The MS as recited in claim 31, wherein the data rate information for each first MAR message comprises:

one or more lower limit data rate fields and one or more upper limit data rate fields for defining lower and upper bounds to the one or more ranges of data rates to which the MAR value in the first MAR message is assigned; and one or more lower limit data rate flags and one or more upper limit data rate flags for identifying whether the one or more lower limit data rate fields and one or more upper limit data rate fields contain valid data, or if default values should be used.

33. The MS as recited in claim 31, the MS processor further programmed for:

communicating the one or more first MAR messages from the MS to the BS at a start of establishment of the connection; and communicating a second set of one or more first MAR messages from the MS to the BS while the connection is active, the second set of one or more first MAR messages for updating the first assignment of one or more MAR values.

34. The MS as recited in claim 33, wherein the second set of one or more first MAR messages are selected to update the first assignment of one or more MAR values in accordance with statistics compiled during the current connection.

35. The MS as recited in claim 31, the MS processor further programmed for determining the one or more first MAR messages by:

enumerating, for each unique MAR value present in a predetermined section of the first assignment of one or more MAR values, one or more sequences of MAR messages for assigning that unique MAR value to those data rates specified in that predetermined section of the first assignment of one or more MAR values;

identifying one or more combinations of sequences of MAR messages for generating the predetermined section of the first assignment of one or more MAR values, each combination containing one sequence for every unique MAR value present in the predetermined section of the first assignment of one or more MAR values; and selecting the combination of sequences of MAR messages that can most efficiently generate the predetermined section of the first assignment of one or more MAR values.

36. The MS as recited in claim 31, the MS processor further programmed for determining the one or more first MAR messages by:

identifying, for the MAR value with the most discrete entries in a predetermined section of the first assignment of one or more MAR values, one or more sequences of MAR messages for assigning that MAR value to those data rates specified in that predetermined section of the first assignment of one or more MAR values; and selecting the sequence of MAR messages that can most efficiently assign that MAR value to those data rates specified in the predetermined section of the first assignment of one or more MAR values, and designating this sequence of MAR messages as the first MAR messages to be transmitted in the one or more first MAR messages.

37. The MS as recited in claim 31, the MS processor further programmed for determining the one or more first MAR messages by:

identifying, for the MAR value assigned over the widest range of data rates in a predetermined section of the first assignment of one or more MAR values, one or more sequences of MAR messages for assigning that MAR value to those data rates specified in that predetermined section of the first assignment of one or more MAR values; and selecting the sequence of MAR messages that can most efficiently assign that MAR value to those data rates specified in the predetermined section of the first assignment of one or more MAR values, and designating this sequence of MAR messages as the first MAR messages to be transmitted in the one or more first MAR messages.

38. The MS as recited in claim 31, the MS processor further programmed for determining the one or more first MAR messages by:

identifying, for the MAR value assigned to the most data rates in a predetermined section of the first assignment of one or more MAR values, one or more sequences of MAR messages for assigning that MAR value to those data rates specified in that predetermined section of the first assignment of one or more MAR values; and selecting the sequence of MAR messages that can most efficiently assign that MAR value to those data rates specified in the predetermined section of the first assignment of one or more MAR values, and designating this sequence of MAR messages as the first MAR messages to be transmitted in the one or more first MAR messages.

39. The MS as recited in claim 31, the MS processor further programmed for determining the one or more first MAR messages by:

storing a mapping of MAR value patterns and efficient sequences of MAR messages for generating the MAR value patterns; and identifying one or more MAR value patterns in the first assignment of one or more MAR values and using the mapping to determine the efficient sequence of MAR messages for generating that MAR value pattern.

40. The MS as recited in claim 31, the MS processor further programmed for identifying the first assignment of one or more MAR values by:

receiving one or more initial MAR messages from the BS, each initial MAR message containing a MAR value and data rate information defining one or more ranges of data rates to which the MAR value is assigned, the one or more initial MAR messages for generating an initial assignment of MAR values across the range of possible data rates for the communication channel;

processing the one or more initial MAR messages to generate the initial assignment of MAR values;

determining current conditions at the MS and using statistics and history compiled by the MS of similar or equivalent conditions to generate a second assignment of MAR values across the range of possible data rates for the communication channel; and negotiating the initial assignment of MAR values with the second assignment of MAR values to determine the first assignment of one or more MAR values.

41. The MS as recited in claim 40, the MS processor further programmed for processing the one or more initial MAR messages by:

for each initial MAR message received at the MS, assigning the MAR value to the one or more ranges of data rates defined in the initial MAR message while overriding any MAR value previously assigned to the one or more ranges of data rates defined in the initial MAR message.

42. The MS as recited in claim 40, the MS processor further programmed for negotiating the initial assignment of MAR values with the second assignment of MAR values by overriding the initial assignment of MAR values with the second of MAR values at those data rates at which a conflict exists.

43. A base station (BS) associated with a mobile station (MS) for establishing a connection and maintaining a communication channel with the MS and configured as a receiving entity for receiving messages from the MS and for performing an acknowledgement procedure for controlling a number of retransmitted messages sent by the MS if a message is not properly received, the BS comprising:

a BS processor programmed for receiving one or more first maximum allowable retransmission (MAR) messages from the MS, each first MAR message containing a MAR value and data rate information defining one or more ranges of data rates to which the MAR value in the first MAR message is assigned, each MAR value representing a maximum number of allowable retransmissions;

processing the one or more first MAR messages to generate a first assignment of one or more MAR values across a range of possible data rates for the communication channel;

configuring the acknowledgement procedure to limit the number of retransmitted messages sent by the MS in accordance with a current data rate of the communication channel and the MAR value assigned to the current data rate;

receiving the one or more first MAR messages from the MS at a start of establishment of the connection; and receiving a second set of one or more first MAR messages from the MS while the connection is active, the second set of one or more first MAR messages for updating the first assignment of one or more MAR values;

wherein the second set of one or more first MAR messages are for updating the first assignment of one or more MAR values in accordance with statistics compiled by the BS during the current connection.

44. The BS as recited in claim 43, wherein the BS processor is further programmed for processing the one or more first MAR messages by assigning, for each first MAR message received by the BS, the MAR value within that first MAR message to the one or more ranges of data rates defined in the first MAR message while overriding any MAR value previously assigned to the one or more ranges of data rates defined in the first MAR message.

45. A base station (BS) associated with a mobile station (MS) for establishing a connection and maintaining a communication channel with the MS and configured as a transmitting entity for transmitting messages to the MS and re-transmitting messages according to an acknowledgement procedure, the MS capable of receiving one or more first MAR messages from the BS for configuring the acknowledgement procedure to limit a number of retransmitted messages sent by the BS, the BS for assisting the MS in configuring the acknowledgement procedure to limit the number of retransmitted messages sent by the BS, the BS comprising:

a BS processor programmed for identifying the first assignment of one or more MAR values across the range of possible data rates for the communication channel by determining current conditions and using statistics and history compiled by the BS processor of similar or equivalent conditions to select efficient MAR values over the range of possible data rates, determining the one or more first MAR messages for generating the first assignment of one or more MAR values, and communicating one or more first MAR messages from the BS to the MS, each first MAR message containing a MAR value and data rate information defining one or more ranges of data rates for the communication channel to which the MAR value in the first MAR message is assigned, the one or more first MAR messages for generating the first assignment of one or more MAR values across the range of possible data rates for the communication channel.

46. The BS as recited in claim 45, wherein the data rate information for each first MAR message comprises:

one or more lower limit data rate fields and one or more upper limit data rate fields for defining lower and upper bounds to the one or more ranges of data rates to which the MAR value in the first MAR message is assigned; and one or more lower limit data rate flags and one or more upper limit data rate flags for identifying whether the one or more lower limit data rate fields and one or more upper limit data rate fields contain valid data, or if default values should be used.

47. The BS as recited in claim 45, the BS processor further programmed for:

communicating the one or more first MAR messages from the BS to the MS at a start of establishment of the connection; and communicating a second set of one or more first MAR messages from the BS to the MS while the connection is active, the second set of one or more first MAR messages for updating the first assignment of one or more MAR values.

48. The BS as recited in claim 47, wherein the second set of one or more first MAR messages are selected to update the first assignment of one or more MAR values in accordance with statistics compiled during the current connection.

49. The BS as recited in claim 45, the BS processor further programmed for determining the one or more first MAR messages by:

enumerating, for each unique MAR value present in a predetermined section of the first assignment of one or more MAR values, one or more sequences of MAR messages for assigning that unique MAR value to those data rates specified in that predetermined section of the first assignment of one or more MAR values;

identifying one or more combinations of sequences of MAR messages for generating the predetermined section of the first assignment of one or more MAR values, each combination containing one sequence for every unique MAR value present in the predetermined section of the first assignment of one or more MAR values; and selecting the combination of sequences of MAR messages that can most efficiently generate the predetermined section of the first assignment of one or more MAR values.

50. The BS as recited in claim 45, the BS processor further programmed for determining the one or more first MAR messages by:

identifying, for the MAR value with the most discrete entries in a predetermined section of the first assignment of one or more MAR values, one or more sequences of MAR messages for assigning that MAR value to those data rates specified in that predetermined section of the first assignment of one or more MAR values; and selecting the sequence of MAR messages that can most efficiently assign that MAR value to those data rates specified in the predetermined section of the first assignment of one or more MAR values, and designating this sequence of MAR messages as the first MAR messages to be transmitted in the one or more first MAR messages.

51. The BS as recited in claim 45, the BS processor further programmed for determining the one or more first MAR messages by:

identifying, for the MAR value assigned over the widest range of data rates in a predetermined section of the first assignment of one or more MAR values, one or more sequences of MAR messages for assigning that MAR value to those data rates specified in that predetermined section of the first assignment of one or more MAR values; and selecting the sequence of MAR messages that can most efficiently assign that MAR value to those data rates specified in the predetermined section of the first assignment of one or more MAR values, and designating this sequence of MAR messages as the first MAR messages to be transmitted in the one or more first MAR messages.

52. The BS as recited in claim 45, the BS processor further programmed for determining the one or more first MAR messages by:
identifying, for the MAR value assigned to the most data rates in a predetermined section of the first assignment of one or more MAR values, one or more sequences of MAR messages for assigning that MAR value to those data rates specified in that predetermined section of the first assignment of one or more MAR values; and
selecting the sequence of MAR messages that can most efficiently assign that MAR value to those data rates specified in the predetermined section of the first assignment of one or more MAR values, and designating this sequence of MAR messages as the first MAR messages to be transmitted in the one or more first MAR messages.

53. The BS as recited in claim 45, the BS processor further programmed for determining the one or more first MAR messages by:
storing a mapping of MAR value patterns and efficient sequences of MAR messages for generating the MAR value patterns; and
identifying one or more MAR value patterns in the first assignment of one or more MAR values and using the mapping to determine the efficient sequence of MAR messages for generating that MAR value pattern.

54. The BS as recited in claim 45, the BS processor further programmed for identifying the first assignment of one or more MAR values by:
receiving one or more initial MAR messages from the MS, each initial MAR message containing a MAR value and data rate information defining one or more ranges of data rates to which the MAR value is assigned, the one or more initial MAR messages for generating an initial assignment of MAR values across the range of possible data rates for the communication channel;
processing the one or more initial MAR messages to generate the initial assignment of MAR values;
determining current conditions at the BS and using statistics and history compiled by the BS of similar or equivalent conditions to generate a second assignment of MAR values across the range of possible data rates for the communication channel; and
negotiating the initial assignment of MAR values with the second assignment of MAR values to determine the first assignment of one or more MAR values.

55. The BS as recited in claim 54, the BS processor further programmed for processing the one or more initial MAR messages by:
for each initial MAR message received at the BS, assigning the MAR value to the one or more ranges of data rates defined in the initial MAR message while overriding any MAR value previously assigned to the one or more ranges of data rates defined in the pre-negotiation MAR message.

56. The BS as recited in claim 54, the BS processor further programmed for negotiating the initial assignment of MAR values with the second assignment of MAR values by overriding the initial assignment of MAR values with the second assignment of MAR values at those data rates at which a conflict exists.

57. A base station (BS) associated with a mobile station (MS) for establishing a connection and maintaining a communication channel with the MS and configured as a transmitting entity for transmitting messages to the MS and re-transmitting messages according to an acknowledgement procedure, the BS comprising:
a BS processor programmed for
receiving one or more first maximum allowable retransmission (MAR) messages from the MS, each first MAR message containing a MAR value and data rate information defining one or more ranges of data rates to which the MAR value in the first MAR message is assigned, each MAR value representing a maximum number of allowable retransmissions;
processing the one or more first MAR messages to generate a first assignment of one or more MAR values across the range of possible data rates for the communication channel;
limiting a number of retransmitted messages sent by the BS in accordance with a current data rate of the communication channel and the MAR value assigned to the current data rate;
receiving the one or more first MAR messages from the MS at a start of establishment of the connection; and
receiving a second set of one or more first MAR messages from the MS while the connection is active, the second set of one or more first MAR messages for updating the first assignment of one or more MAR values;
wherein the second set of one or more first MAR messages are for updating the first assignment of one or more MAR values in accordance with statistics compiled by the MS during the current connection.

58. The BS as recited in claim 57, wherein the BS processor is further programmed for processing the one or more first MAR messages by assigning, for each first MAR message received by the BS, the MAR value within that first MAR message to the one or more ranges of data rates defined in the first MAR message while overriding any MAR value previously assigned to the one or more ranges of data rates defined in the first MAR message.

59. A base station (BS) associated with a mobile station (MS) for establishing a connection and maintaining a communication channel with the MS and configured as a receiving entity for receiving messages from the MS and for performing an acknowledgement procedure for assisting the MS in controlling a number of retransmitted messages sent by the MS if a message is not properly received, the MS capable of receiving one or more first maximum allowable retransmission (MAR) messages from the BS to limit a number of retransmitted messages sent by the MS, the BS comprising:
a BS processor programmed for
identifying the first assignment of one or more MAR values across the range of possible data rates for the communication channel by determining current conditions and using statistics and history compiled by the BS processor of similar or equivalent conditions to select efficient MAR values over the range of possible data rates,
determining the one or more first MAR messages for generating the first assignment of one or more MAR values, and
communicating one or more first MAR messages from the BS to the MS, each first MAR message containing a MAR value and data rate information defining one or more ranges of data rates for the communication channel to which the MAR value in the first MAR message is assigned, the one or more first MAR messages for generating the first assignment of one or more MAR values across the range of possible data rates for the communication channel.

60. The BS as recited in claim 59, wherein the data rate information for each first MAR message comprises:
one or more lower limit data rate fields and one or more upper limit data rate fields for defining lower and upper bounds to the one or more ranges of data rates to which the MAR value in the first MAR message is assigned; and
one or more lower limit data rate flags and one or more upper limit data rate flags for identifying whether the one or more lower limit data rate fields and one or more upper limit data rate fields contain valid data, or if default values should be used.

61. The BS as recited in claim 59, the BS processor further programmed for:
communicating the one or more first MAR messages from the BS to the MS at a start of establishment of the connection; and
communicating a second set of one or more first MAR messages from the BS to the MS while the connection is active, the second set of one or more first MAR messages for updating the first assignment of one or more MAR values.

62. The BS as recited in claim 61, wherein the second set of one or more first MAR messages are selected to update the first assignment of one or more MAR values in accordance with statistics compiled during the current connection.

63. The BS as recited in claim 59, the BS processor further programmed for determining the one or more first MAR messages by:
enumerating, for each unique MAR value present in a predetermined section of the first assignment of one or more MAR values, one or more sequences of MAR messages for assigning that unique MAR value to those data rates specified in that predetermined section of the first assignment of one or more MAR values;
identifying one or more combinations of sequences of MAR messages for generating the predetermined section of the first assignment of one or more MAR values, each combination containing one sequence for every unique MAR value present in the predetermined section of the first assignment of one or more MAR values; and
selecting the combination of sequences of MAR messages that can most efficiently generate the predetermined section of the first assignment of one or more MAR values.

64. The BS as recited in claim 59, the BS processor further programmed for determining the one or more first MAR messages by:
identifying, for the MAR value with the most discrete entries in a predetermined section of the first assignment of one or more MAR values, one or more sequences of MAR messages for assigning that MAR value to those data rates specified in that predetermined section of the first assignment of one or more MAR values; and
selecting the sequence of MAR messages that can most efficiently assign that MAR value to those data rates specified in the predetermined section of the first assignment of one or more MAR values, and designating this sequence of MAR messages as the first MAR messages to be transmitted in the one or more first MAR messages.

65. The BS as recited in claim 59, the BS processor further programmed for determining the one or more first MAR messages by:
identifying, for the MAR value assigned over the widest range of data rates in a predetermined section of the first assignment of one or more MAR values, one or more sequences of MAR messages for assigning that MAR value to those data rates specified in that predetermined section of the first assignment of one or more MAR values; and
selecting the sequence of MAR messages that can most efficiently assign that MAR value to those data rates specified in the predetermined section of the first assignment of one or more MAR values, and designating this sequence of MAR messages as the first MAR messages to be transmitted in the one or more first MAR messages.

66. The BS as recited in claim 59, the BS processor further programmed for determining the one or more first MAR messages by:
identifying, for the MAR value assigned to the most data rates in a predetermined section of the first assignment of one or more MAR values, one or more sequences of MAR messages for assigning that MAR value to those data rates specified in that predetermined section of the first assignment of one or more MAR values; and
selecting the sequence of MAR messages that can most efficiently assign that MAR value to those data rates specified in the predetermined section of the first assignment of one or more MAR values, and designating this sequence of MAR messages as the first MAR messages to be transmitted in the one or more first MAR messages.

67. The BS as recited in claim 59, the BS processor further programmed for determining the one or more first MAR messages by:
storing a mapping of MAR value patterns and efficient sequences of MAR messages for generating the MAR value patterns; and
identifying one or more MAR value patterns in the first assignment of one or more MAR values and using the mapping to determine the efficient sequence of MAR messages for generating that MAR value pattern.

68. The BS as recited in claim 59, the BS processor further programmed for identifying the first assignment of one or more MAR values by:
receiving one or more initial MAR messages from the MS, each initial MAR message containing a MAR value and data rate information defining one or more ranges of data rates to which the MAR value is assigned, the one or more initial MAR messages for generating an initial assignment of MAR values across the range of possible data rates for the communication channel;
processing the one or more initial MAR messages to generate the initial assignment of MAR values;
determining current conditions at the BS and using statistics and history compiled by the BS of similar or equivalent conditions to generate a second assignment of MAR values across the range of possible data rates for the communication channel; and
negotiating the initial assignment of MAR values with the second assignment of MAR values to determine the first assignment of one or more MAR values.

69. The BS as recited in claim 67, the BS processor further programmed for processing the one or more initial MAR messages by:

for each initial MAR message received at the BS, assigning the MAR value to the one or more ranges of data rates defined in the initial MAR message while overriding any MAR value previously assigned to the one or more ranges of data rates defined in the initial MAR message.

70. The BS as recited in claim 67, the BS processor further programmed for negotiating the initial assignment of MAR values with the second assignment of MAR values by overriding the initial assignment of MAR values with the second of MAR values at those data rates at which a conflict exists.

* * * * *